United States Patent
Bhusri

(10) Patent No.: US 6,393,118 B1
(45) Date of Patent: May 21, 2002

(54) SERVICE AND INFORMATION MANAGEMENT SYSTEM FOR A TELECOMMUNICATIONS NETWORK

(75) Inventor: Gurcharan S. Bhusri, Holmdel, NJ (US)

(73) Assignee: AT&T CORP., New York, NY (US)

( * ) Notice: Subject to any disclaimer, the term of this patent is extended or adjusted under 35 U.S.C. 154(b) by 0 days.

(21) Appl. No.: 09/041,457

(22) Filed: Mar. 12, 1998

Related U.S. Application Data

(62) Division of application No. 08/837,830, filed on Apr. 22, 1997, now Pat. No. 5,878,113, which is a division of application No. 08/442,529, filed on May 16, 1995, now Pat. No. 5,729,597.

(51) Int. Cl.[7] .......................... H04M 7/00; H04M 15/00
(52) U.S. Cl. .................. 379/219; 379/230; 379/221.14; 379/114.14
(58) Field of Search .................. 379/26, 145, 192, 379/195, 196, 9–15, 111, 121, 133, 144, 207, 219, 220, 222, 229, 230; 370/392, 393, 390, 400, 522

(56) References Cited

U.S. PATENT DOCUMENTS

| | | | |
|---|---|---|---|
| 4,959,849 A | | 9/1990 | Bhusri |
| 5,008,929 A | | 4/1991 | Olsen et al. |
| 5,425,021 A | * | 6/1995 | Derby et al. ................. 370/408 |
| 5,467,645 A | * | 11/1995 | Cutler et al. ................. 370/229 |
| 5,495,521 A | * | 2/1996 | Rangachar ................ 379/93.04 |
| 5,506,838 A | * | 4/1996 | Flanagan ..................... 370/258 |
| 5,519,772 A | * | 5/1996 | Akman et al. ............... 379/265 |
| 5,537,394 A | * | 7/1996 | Abe et al. .................... 370/252 |
| 5,537,611 A | | 7/1996 | Rajagopal et al. |
| 5,546,452 A | * | 8/1996 | Andrews et al. ............. 379/219 |
| 5,559,871 A | | 9/1996 | Smith |
| 5,563,878 A | * | 10/1996 | Blakeley et al. ............. 370/392 |
| 5,606,601 A | | 2/1997 | Witzman et al. |
| 5,740,234 A | * | 4/1998 | Black et al. .................. 379/115 |
| 5,907,602 A | * | 5/1999 | Peel et al. .................... 379/114 |
| 5,915,008 A | * | 6/1999 | Dulman ....................... 379/201 |

FOREIGN PATENT DOCUMENTS

| | | |
|---|---|---|
| EP | 0 493 896 A2 | 7/1992 |
| EP | 0 557 566 A1 | 9/1993 |

* cited by examiner

Primary Examiner—Ahmad F. Matar
Assistant Examiner—Hector A. Agdeppa

(57) ABSTRACT

A system for service control and operations for a telecommunications network. In particular, an architecture and method for a service control and operations element system. The system communicates with a plurality of interconnected telecommunications network elements via a switching and signaling subsystem. The system provides and controls the various functions of the telecommunications network, such as call processing and routing, automatic fault detection and correction, providing services to customers in an interactive manner, fraud detection and control, identification of patterns of abuse of the network, collecting data regarding call activity at each network element, and producing a record of each call placed within the network.

8 Claims, 15 Drawing Sheets

SERVICE AND INFORMATION MANAGEMENT SYSTEM FOR A TELECOMMUNICATIONS NETWORK

CROSS-REFERENCE TO RELATED APPLICATION

This application is a division of U.S. application Ser. No. 08/837,830, filed Apr. 22, 1997, U.S. Pat. No. 5,878,113, which is a division of U.S. application Ser. No. 08/442,529, filed May 16, 1995, U.S. Pat. No. 5,729,597.

TECHNICAL FIELD

The invention relates generally to service and operations control for. a telecommunications network, and more particularly to a service control and operations element system which performs and controls various functions of the telecommunications network.

BACKGROUND OF THE INVENTION

Management of modern telecommunications networks requires performing multiple functions, including call establishment and routing, fault management, call details recording used to compile customer bills, fraud detection and control, new services provisioning, post-dialing delay measurement and time synchronization. Currently, multiple systems within a telecommunications network perform these various functions.

In a telecommunications network, information in the form of signaling messages is exchanged between network elements involved in call establishment and control. Switches, databases and the like are used to carry out the information exchange.

Common channel signaling is an out-of-band technique for exchanging information over channels separate from those used to carry voice or data signals. One well-known signaling technique utilizes the Comite Consultatif International Telegraphique et Telephonique (CCITT) Signaling System no. 7 (SS7) protocol. In the interface between an AT&T network device and a Private Branch Exchange (PBX), a second well known signaling technique utilizes Q.931 protocol. In SS7 protocol, the messages are highly structured information fields of bits that are differentiated from each other by a length indicator. A detailed discussion relating to the format of the SS7message and to the interrelation of SS7 and Q.931 protocols is given in the CCITT Blue Book, *Specification of Signaling System No. 7*, Vol. 6 (1988). For a discussion of common channel signaling No. 7 protocol in general, see G. G. Schanger, *IEEE Journal on Selected Areas in Communication*, Vol. SAC-4, No. 3, pp. 360–65 (1986), and S. Suzuki et al., *Review of the Electrical Communication Laboratories*, Vol. 28, No. 1–2, pp. 50–65 (1980) (each of which is incorporated herein by reference).

The network elements associated with a typical telecommunications network, such as the AT&T switched network, which are commonly traversed by a call include the following: (1) an originating switch node associated with the network, located in the geographic area of the calling party, which receives a call request message from a local exchange carrier or a competitive access provider, and is responsible for controlling the call set-up; (2) a terminating switch node, also associated with the network, but located in the geographic area of the called party, which connects the call to a local exchange carrier or a private branch exchange associated with the called party; (3) a via switch, used when a direct path between the originating switch node and the terminating switch node is not available because all direct trunks from the originating to the terminating switch nodes are busy, but an idle path exists which may be activated by using the via switch to reach the terminating switch node (for simplicity, references to via switches are omitted in the text and figures); (4) a service control point, which acts as a database that instructs the originating switch node as to the processing and routing of certain calls; and (5) signal transfer points, deployed in mated pairs, connected to the originating switch node, the terminating switch node,,and the service control point by access links, used for transferring messages between network elements.

A typical call in North America has a called number of the form N0/1X NXX-XXXX, N being any number 2 through 9, 0/1 being either a 0 or a 1, X being any number 0 through 9, where the 10-digit code from left to right generally represents: a three-digit area code, a three-digit central office code, and a four-digit station number. The area code digits identify a geographic region in North America, the central office code digits identify the central office exchange serving the called party and the station code digits provide identification of the called party.

When the first three digits in the number are 800 or 900, however, the number is not directly associated with a geographic region. Some or all of the digits in an 800/900-type number normally must be translated into a physical destination by a service control point, which maintains a table of 800/900 numbers and the physical destinations associated with the numbers. Such a translation is referred to as a global title translation, and the tables maintained by the service control points are referred to as global title translation tables. The switches and/or signal transfer points maintain tables which identify which service control points serve which 800/900 numbers.

A signaling message flow for a typical call of the type 800 NXX XXXX or 900 NXX XXXX which traverses the various network elements is as follows.

An originating switch node receives a call request message, typically in the form of an initial address message, from a local exchange network or a competitive access provider serving the calling party. The originating switch node validates the message. If an error is detected in the message during the validation process, the call flow ends.

If no error is detected in the message, the originating switch node looks to its global title translation table to determine the identity of a service control point which can provide processing and routing instructions for the call. The global title translation table contains entries representing all numbers served by the network (e.g., 800 NXX XXXX or 900 NXX XXXX). For each dialed number, the table provides a service control point identification and a subsystem number identifying the application at that service control point. If the dialed number does not match an entry in the global title translation table, either the table is in error or the local exchange carrier switch or competitive access provider's switch misrouted the call.

Assuming a valid dialed number entry exists in the table, the originating switch node formulates a query message, also called a transaction capabilities application part message, requesting call routing and processing information. The originating switch node sends the query message to the service control point identified by the global title translation table. In some existing systems, a signal transfer point, instead of the originating switch node, looking at its own global title translation tables, routes a query message to the identified service control point.

After the service control point receives the query message, it formulates a response message containing instructions for processing and routing the call, and forwards the response message back to the originating switch node. If the service control point determines that it does not serve the dialed number received in the query message, the service control point will identify the error in the response message. Thus, the response message may contain instructions for processing and routing the call, or may be used to communicate that the call is being aborted because of an error detected at the service control point.

The originating switch node receives the response message and validates it. Assuming reception and validation of the response message is successful, the originating switch node proceeds to route the call. As part of the routing function, it sends the request message to a terminating switch node via a signal transfer point.

After the terminating switch node receives the request message from the signal transfer point and validates it, it forwards the request message to a local exchange carrier or private branch exchange serving the called party. If a private branch exchange serves the called party, however, the terminating switch node forwards, using Q.931 protocol, a set-up message (equivalent to the request message) to the private branch exchange. In both cases, the signaling in the forward direction for the call is thereby completed.

For a call terminating at a local exchange carrier, the local exchange carrier switch receives the called number, forwards the call to a known telephone destination and sends an address complete message to the terminating switch node indicating that the called party is alerted to the incoming call. For a call terminating at a private branch exchange, the private branch exchange receives the called number, and sends a call proceeding message and an alerting message to the terminating switch node.

After the terminating switch node receives either the address complete message or the alerting message, it regenerates an address complete message and sends it to the originating switch node. The originating switch node forwards the address complete message it receives from the terminating switch node to the local exchange carrier or competitive access provider switch associated with the calling party. Each switch provides a through connection for a voice path. The calling party then hears a ring back tone.

When the called party answers the call, either the called party's local exchange carrier sends an answer message, or the called party's private branch exchange sends a connect message, to the terminating switch node. If the called party is a private branch exchange, the terminating switch node sends a connect acknowledge message to the private branch exchange. Once the terminating switch node receives either the answer message or the connect message, it regenerates an answer message to the originating switch node.

The originating switch node regenerates the answer message to the local exchange carrier or competitive access provider switch associated with the calling party. After the calling and called parties hold a conversation, and the calling party hangs up, the local exchange carrier or competitive access provider switch sends a release message to the originating switch node. The originating switch node then sends the release message to the terminating switch node.

For a call completing to a local exchange carrier, the terminating switch node sends the release message to the local exchange carrier. The local exchange carrier responds with a release complete message, resulting in the call being torn down. The breakdown of a Q.931 connection to a private branch exchange requires the terminating switch node to send a disconnect message to the private branch exchange. The private branch exchange then sends a Q.931 release message to the terminating switch node. The terminating switch node in response sends a Q.931 protocol release complete message to the private branch exchange, which also results in the call being torn down.

The same call flow usually applies when the dialed number contains an area code indicating a geographic region associated with the called party, except that originating switch nodes are often able to route these calls based on their own routing tables, using additional information from automatic number identification tables and dialed number tables, without sending query messages to service control points for routing and processing instructions.

When services based on calling and called numbers are offered to network customers, automatic number identification tables and dialed number tables are maintained by each switch. Each table may contain millions of entries, and the number of entries increases as the services offered to a large population are expanded.

Network customers maintaining an 800 or 900 number often subscribe to a time-of-day routing service, such that their calls are directed to different telephone destinations at different times of the day. The translation of an 800 or 900 number to a physical destination based on time-of-day is performed by a service control point which uses its own local clock as a time reference. Typically, there is no provision for clock synchronization throughout the network, so that if the local clock is not accurate, calls of customers subscribing to a time-of-day routing service may be directed to the wrong location.

Customers may also subscribe to a data collection and reporting service which provides information regarding the distribution of 800 or 900 calls by time-of-day, day-of-week, etc. as well as distribution by destination and origin of calls. This information is commonly generated by service control points and sent periodically to a central computer, Alternatively, equipment is placed on each incoming and outgoing SS7 signaling link to collect messages going to or coming from each service control point. These data collection methods, however, do not provide information regarding calls which failed in the call set-up stage, such as calls which never reached a service control point. In addition, part of the processing power of the service control point is expended to perform these functions when the service control point collects and sends data to a central computer, and placing equipment to collect data on each link to each service control point represents a cumbersome and costly method of data collection.

Post-dialing delay, i.e., the delay between dialing of the called number and the receipt of the ring-back tone, has become a direct measure of the quality of network performance. Currently, measurement of post-dialing delay is limited because there is no satisfactory mechanism in place to monitor post-dialing delay on an ongoing basis.

The call details recording function for customer billing for a telecommunications network is commonly performed by originating switch nodes. An originating switch node analyzes the per call messages corresponding to the calls it controls, as described above. The switch node sets call billing parameters for a call when it receives the response message containing processing and routing information for the call from a service control point. The switch node notes the time the called party answered and the time the connection was released, and prepares a call detail record. Call detail records are forwarded to a data-processing center where the data is periodically processed to compute customer charges.

Utilizing the originating switch node to perform these functions results in limited flexibility for user-defined billing, and the inability to detect and control fraud or abuse of the telecommunications network, such as stalking, in real-time. A stalker is a person who places a call to a target party for purposes of harassment, etc. When the called party answers, the stalker hangs up. Currently, the call is not billed and there is no record of the stalker's abusive calls. Also, since data regarding calls is collected from originating switch nodes and other network elements only periodically, real-time detection of faults in the network is not possible.

Fault management has been handled in various ways in prior art systems, none of which are completely satisfactory. In one common practice, when an error is detected during the validation process performed by a network element, the network element responsible for validating the message stores the data regarding the error. The network element is then typically polled to retrieve the error data, or programmed to report the error data at predetermined intervals to a central computer. This can result in errors occurring and remaining undetected for a certain period of time.

Alternatively, selected calls entering a network system can be placed under surveillance by setting a predetermined bit called a surveillance bit in the messages associated with a particular call. The messages with their surveillance bits set are copied and forwarded to a processing element by each network element traversed by the call. As a result, a history for each selected call is provided up to the call's failure. For a detailed discussion of such a call surveillance technique, see Bhusri, U.S. Pat. No. 4,959,849. A description of a network element architecture capable of switching messages between the other network elements and also of reproducing the message and forwarding the reproduced message over a data network to a central processor may also be found in Bhusri at col. 5.

Even using the call surveillance technique, inability to effectively and efficiently monitor the status of each call entering a telecommunications system in real-time may result in errors occurring and going undetected.

SUMMARY OF THE INVENTION

In one aspect of the present invention, an apparatus for servicing a telephone call made in a telecommunications network includes an interconnect bus for communicating with a database and a communications unit. The communications unit is in communication with interconnected network elements, instructing the network elements as to routing of the calls traversing the network elements. Information associated with each call is transmitted to the communications unit for storage in the database. In another aspect of the invention, the communications unit creates a record of the calls traversing the network elements for billing purposes.

In yet another aspect of the invention, an apparatus for servicing a telephone call in a telecommunications network includes an interconnect bus communicating with a processor, a database, and a communications unit. Instructions residing on the processor perform and control various functions of the network. An information packet containing data which supports the functions of the network is transmitted between interconnected network elements and the communications unit.

In preferred embodiments, the instructions residing on the processor allow the apparatus to centrally perform various functions associated with the telecommunications network, including call processing and routing, automatic fault detection and correction, providing services to customers in an interactive manner, fraud detection and control, identification of patterns of abuse of the network and producing a record of each call placed within the network.

In a further aspect, the present invention includes a method of recording information generated by the interconnected network elements in response to a call traversing the network elements. According to this method, an originating network element receives messages from all of the network elements which provide a path through the network for the call. The originating network element copies the messages, appends information to the messages, including an error signal, so that the copied messages and the appended information form individual information packets, and forwards the information packets to a communications unit. The communications unit ensures that the information packets pertaining to each call in the network are stored in a database. The information packet database is utilized to provide the various functions of the telecommunications network.

In a preferred embodiment, a test call which originates and terminates at the communications unit is initiated in response to errors indicated in the information packets. In response to the test call being placed, each network element sends to the communications unit, via information packets, representations of all messages generated and received by that element. These information packets are also stored in the database. In this manner, a complete set of data about each call in which an error was detected is formed, and causes of various errors may be identified and corrected.

In a still further aspect, the present invention includes a second method of establishing a through path for a call over the interconnected network elements. According to this method, a first network element detects a request message for a through path, forwards the message to succeeding network elements in the through path, copies the message, appends information to the message, including an indication that a second network element is seeking instructions regarding processing and routing of the call, so that the copied message and the appended information form an information packet, and forwards the information packet to a central location having data tables containing processing and routing instructions for individual calls. Once the data tables are consulted to determine the required processing and routing of the call, a message containing processing and routing instructions for the call is transmitted to the second network element. The second network element correlates the request message with the message transmitted from the central location.

In preferred embodiments, the second network element is an originating network element. Accordingly, selected interconnected network elements traversed by the call transmit messages to the originating network element. The originating network element forwards information packets associated with the messages to a communications unit, which correlates the information packet associated with the request message with the information packets forwarded by the originating network element. The information packets pertaining to a particular call are stored in a database.

The advantages of the present invention will become readily apparent to those skilled in this art from the following detailed description, wherein the preferred embodiments of the invention have been described. As will be realized, the invention is capable of other and different embodiments, and its details are capable of modifications in various obvious respects, all without departing from the invention. Accordingly, the drawings and description are to be regarded as illustrative in nature, and not as restrictive.

BRIEF DESCRIPTION OF THE DRAWINGS

The invention will be more readily understood after reading the following detailed description of specific illustrative embodiments of the invention in conjunction with the appended drawings, wherein.

DETAILED DESCRIPTION OF PREFERRED EMBODIMENTS

Figure 1:
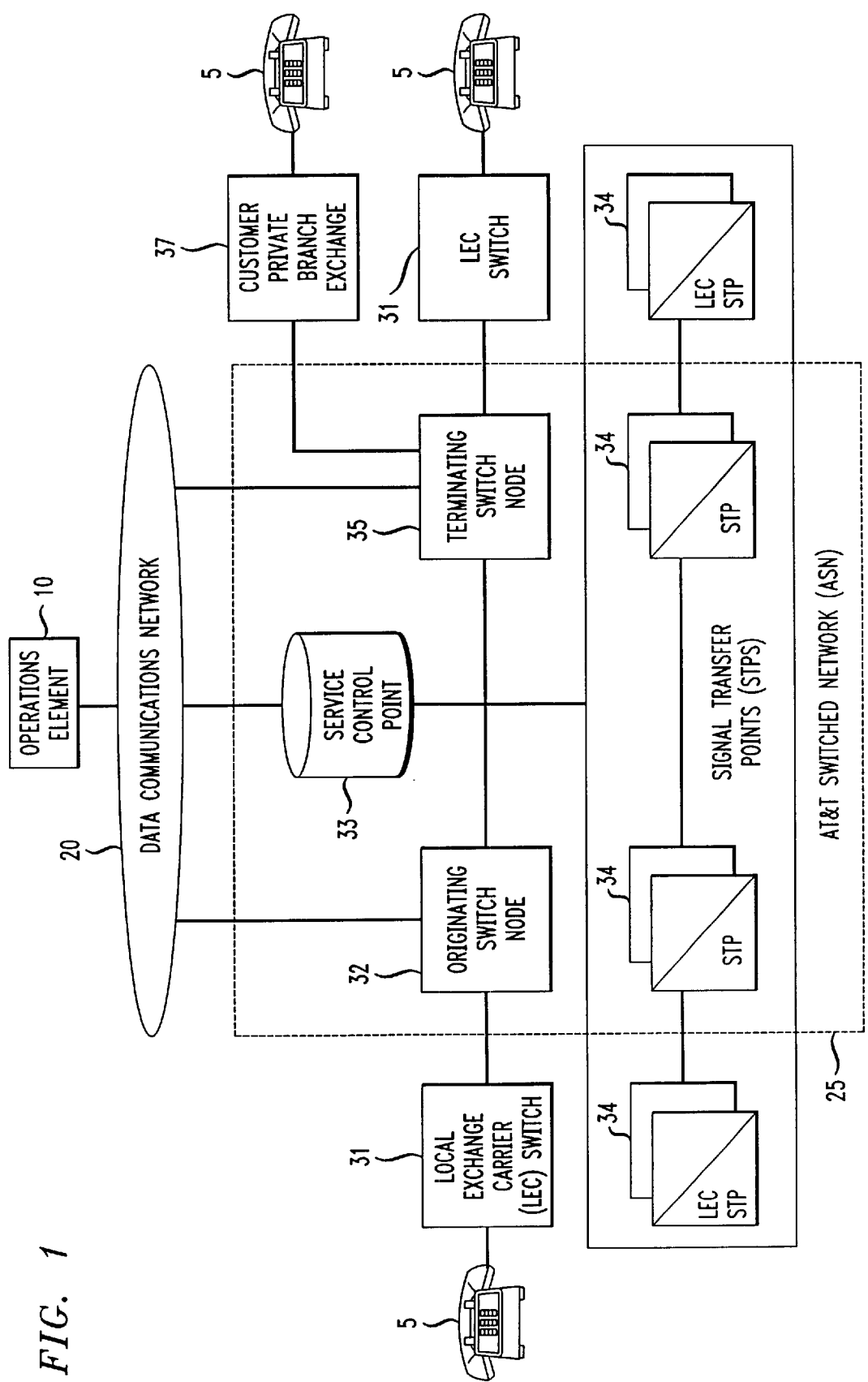
FIG. 1 illustrates an overview of the management of a telecommunications system according to the present invention.

FIG. 1 illustrates, in block diagram form, an overview of the management of a telecommunications system according to a preferred embodiment of the present invention. A service control and operations element (hereafter "operations element") 10 communicates with a telecommunications network 25 such as the AT&T switched network via a data communications network 20. Data communications network 20 provides T3 rate (45 Mbits per second) direct signaling links from the operations element 10 to a number of elements associated with the network 25. The network elements depicted in FIG. 1 include: an originating switch node 32, a service control point 33, a terminating switch node 35, and a plurality of signal transfer points 34. The originating switch node 32 is connected to a customer telephone 5 by a local exchange carrier switch 31. The terminating switch node 35 is connected to customer telephones 5 by both a customer private branch exchange 37 and a local exchange carrier switch 31.

Figure 2:
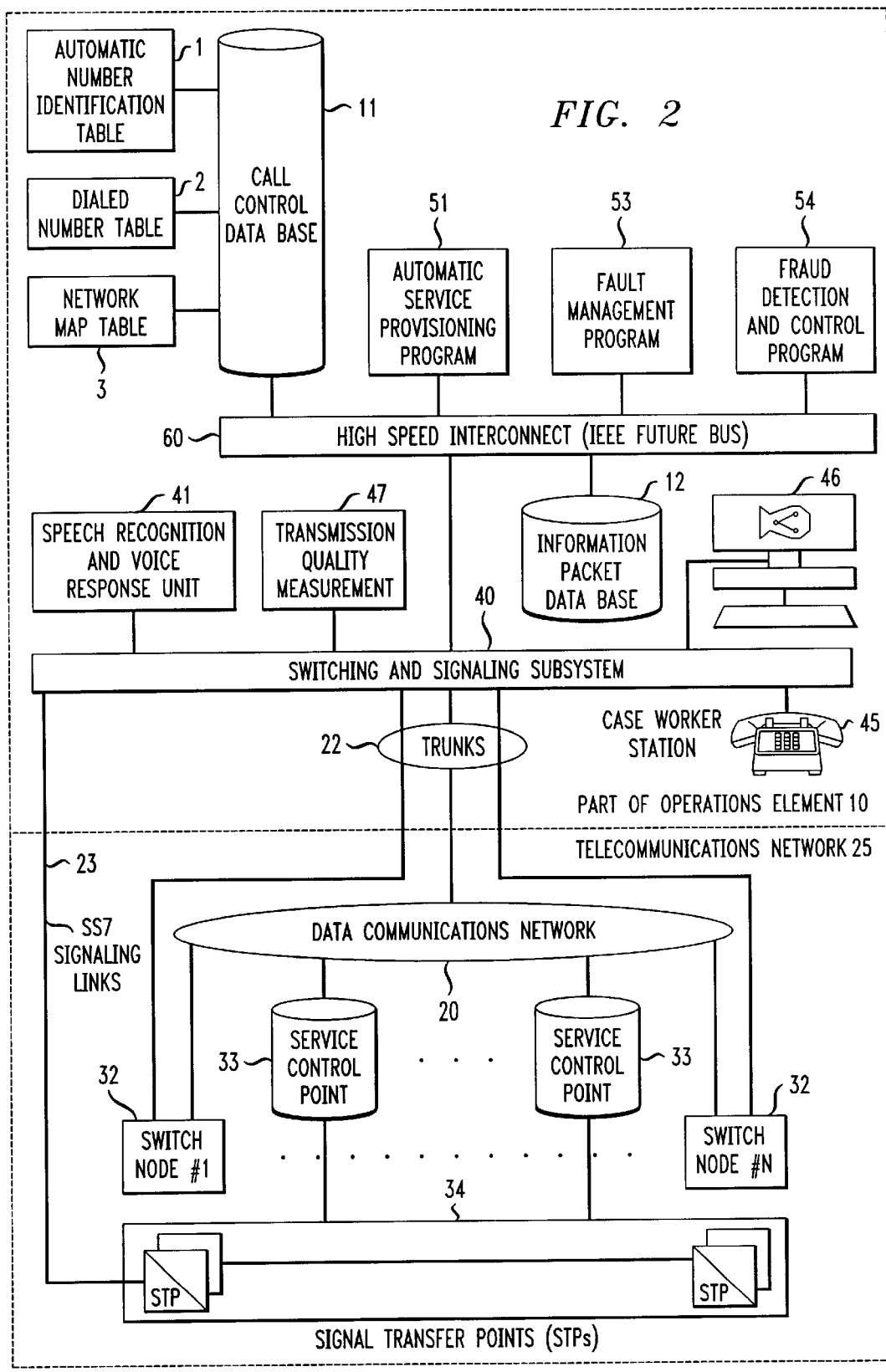
FIG. 2 illustrates a block diagram architecture of the switching and signaling subsystem which connects the operations element with the network elements of a telecommunications system.

As shown in more detail in FIG. 2, operations element 10 preferably includes a communications unit such as a switching and signaling subsystem 40, which controls the connections of the operations element 10 to each network element associated with the telecommunications network 25, including a plurality of switch nodes 32, such as originating switch nodes, a plurality of signal transfer points 34 and a plurality of service control points 33. A number of trunk connections 22 provide at least 64 Kbits per second connections to accommodate the testing of broadband communications through the telecommunications network 25 being managed. The switching and signaling subsystem 40 also has an interface to SS7 signaling links 23 to permit the subsystem 40 to interface with the network elements using SS7 protocol.

In addition to interfacing with network elements such as switch nodes 32, signal transfer points 34 and service control points 33, the switching and signaling subsystem 40 also supports switching of callers to a case worker station 45 for trouble reports and customer inquiries. The subsystem 40 may also be in communication with a speech recognition and voice response unit 41, allowing customers to interact directly with the operations element 10 for subscribing to new services and to inquire regarding the status of orders for service, the status of bill discrepancies and the like. Computer test equipment 46 in conjunction with a transmission quality measurement system 47 allows the operations element 10 to perform quality testing on any switched path between switch nodes 32 (explained below).

The subsystem 40 communicates with a number of processors and databases 11, 12 (explained further below) associated with the operations element 10 via a high-speed interconnect 60, preferably such as provided by an IEEE Future Bus. The switching and signaling subsystem 40 may also have direct connections to the call control database 11 and to the information packet database 12. The processors, which may of the same or different types, preferably support, among other applications, an Automatic Service Provisioning program 51, a Fault Management application 53 and a Fraud Detection and Control program 54 (explained further below).

The call control database 11 contains data tables such as an Automatic Number Identification table 1, which contains a list of phone numbers and associated information on services to be provided and restrictions to be imposed; a Dialed Number Table 2, containing a list of dialed addresses associated with a called party and instructions for processing and routing calls; and a Network Map table 3, which provides information as to which switches 32 and service control points 33 are served by which signal transfer points 34.

When the detailed instructions for processing and routing a call reside at a service control point, the Dialed Number Table 2 identifies the service control point and the subsystem number of the application at the service control point. The service control point has its own dialed number table (not shown) for a subset of the dialed number that it serves. This dialed number table has pointers to customer records containing detailed instructions for processing and routing the call. This arrangement permits feature-rich calls to be handled by the service control points and all other calls to be handled by the operations element.

The customer record may also contain the current address of a customer who has subscribed to a call forwarding service. The customer may have calls forwarded by dialing an 800 number, being connected to a speech recognition unit and interactively providing the telephone number to which calls should be forwarded.

The Automatic Number Identification table 1 is consulted by the fraud detection and control application 54 while a call is being set up in the network 25. The fraud detection application 54 compares the digits of a calling party's phone number against the Automatic Number Identification table 1 to see if the calling party's phone number has been marked for fraud. The fraud detection application 54 also examines the caller's billing profile to determine if the caller has accumulated billing charges, and considers the impact of charges associated with an abnormally long call being served by the network. If fraud is suspected, the fraud control application 54 will send a message to the switch node 32 handling the call, requesting forced release of the call.

The Automatic Service Provisioning function 51 also utilizes the databases 11, 12. A customer requesting new services is connected to the Speech Recognition and Voice Response Unit 41 of the operations element 10. The customer is queried in an interactive manner for subscription information. The information provided by the customer is divided into a pre-defined number of data entries for each uniquely defined service. While the customer waits, the Automatic Service Provisioning function 51 verifies the information provided by the customer and checks the Automatic Number Identification table 1 for fraud or accumulated billing charges associated with the customer's phone number. After the customer hangs up, the operations element 10 immediately creates a customer record relating to the service requested.

Figure 3:
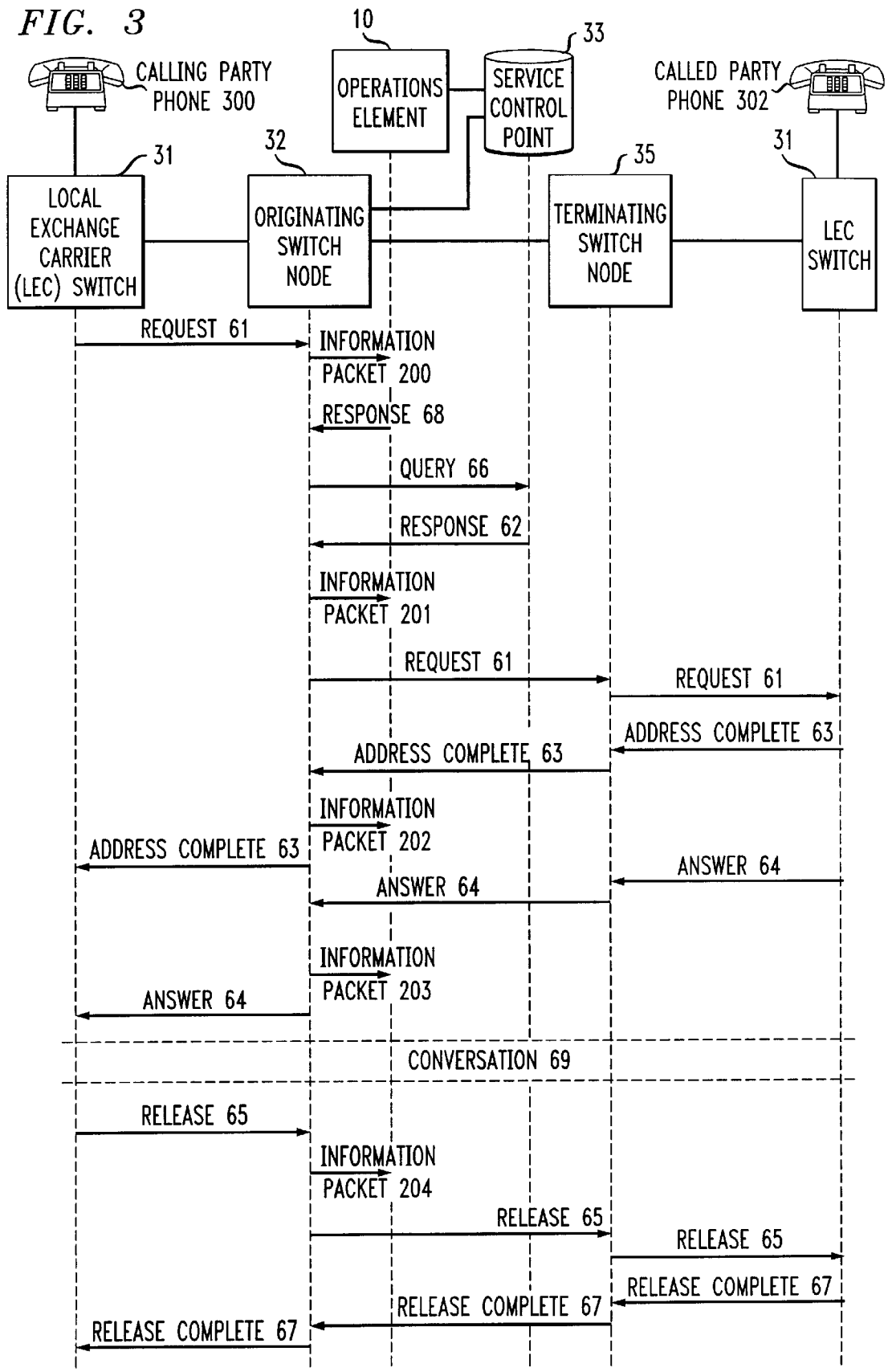
FIG. 3 illustrates information packets each containing a message and transaction information sent to the operations element by an originating switch node on a call placed from a local exchange network completing to a local exchange network.

FIG. 3 illustrates a typical message flow for a call established by a telecommunications network (time increases from top to bottom) according to the present invention. The call completes from a local exchange carrier switch 31 in the geographic area of a calling party's phone 300 to another local exchange carrier switch 31 in the geographic area of the called party's phone 302, traversing several interconnected network elements such as an originating switch node 32, a service control point 33 and a terminating switch node 35. The originating switch node 32 controls the call set-up and receives the following messages from the interconnected network elements as the call traverses the network elements: a request message 61, a response message 68 from an operations element 10 which instructs the originating switch node 32 to send a query message 66 to the service control point 33 so as to obtain routing and processing instructions for the call, a response message 68 from the service control point 33 containing the routing and processing instructions for the call, an address complete message 63, an answer message 64 indicating that the called party is available to hold a conversation 69, and a release message 65. Some of these messages are transmitted across more than one network element.

The originating switch node 32 replicates each message received from a network element and adds a transaction information appendage to each message. The message plus the transaction information appended to the message form information packets. Information packet 200 is associated with the request message 61, packet 201 is associated with the response message 62, packet 202 is associated with the address complete message 63, packet 203 is associated with the answer message 64 and packet 204 is associated with the release message 65.

As they are created, the information packets 200–204 are forwarded from the originating switch node 32 to the operations element 10 via the switching and signaling subsystem 40 (shown in FIG. 2). The operations element 10 receives the information packets 200–204 in real time, validates them, and stores them. Referring to FIG. 2, the information packets associated with all calls served by the telecommunications network 25 comprise an information packet database 12. Various software applications, such as the automatic service provisioning program 51, residing on a processor in the operations element 10, utilize the database 12 to perform their assigned functions.

Figure 4:
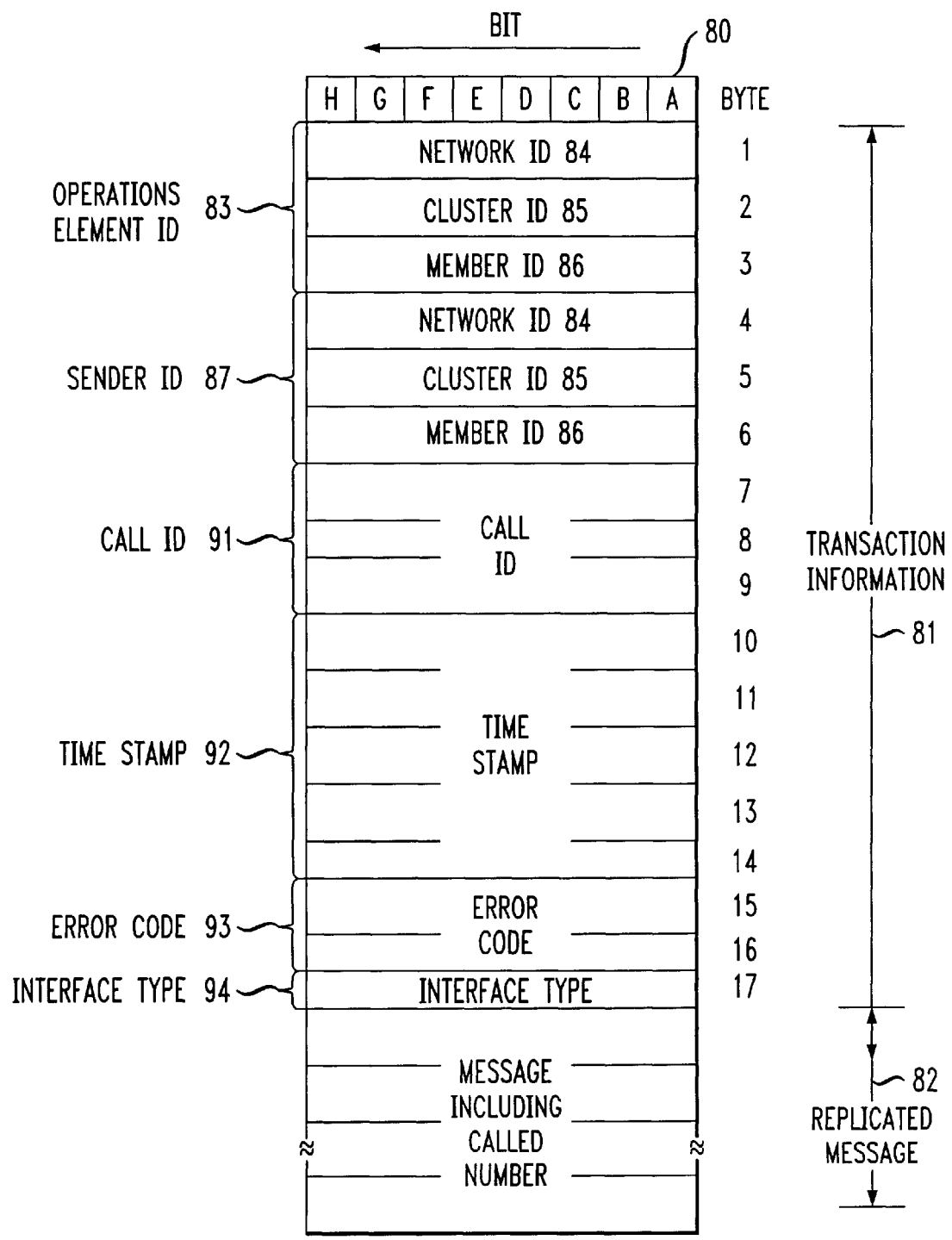
FIG. 4 illustrates a typical information packet sent to the operations element by a network element.

FIG. 4 illustrates the structure of a typical information packet 80 sent to the operations element. The transaction information 81 appended to the replicated message 82 is typically seventeen bytes long (each byte is eight bits long). The transaction information fields include: an operations element ID field 83, which identifies the network ID 84, cluster ID 85 and member ID 86 associated with the operations element serving the call, if there is more than one operations element; a sender ID field 87, which identifies the network ID 84, cluster ID 85, and member ID 86 associated with a particular originating switch node; a call ID field 91, which identifies numbers assigned to the call by the originating switch node; a time stamp field 92; an error code field 93, which, if an error is detected by a network element during call set-up, contains a value indicating the type of error which was detected; and an interface type field 94, which identifies the message type as SS7 or Q.931.

Information packets 80 pertaining to a particular call are correlated by the operations system by call ID 91, sender ID 97 (i.e., the originating switch node associated with the call), and time stamp 92.

Figure 5:
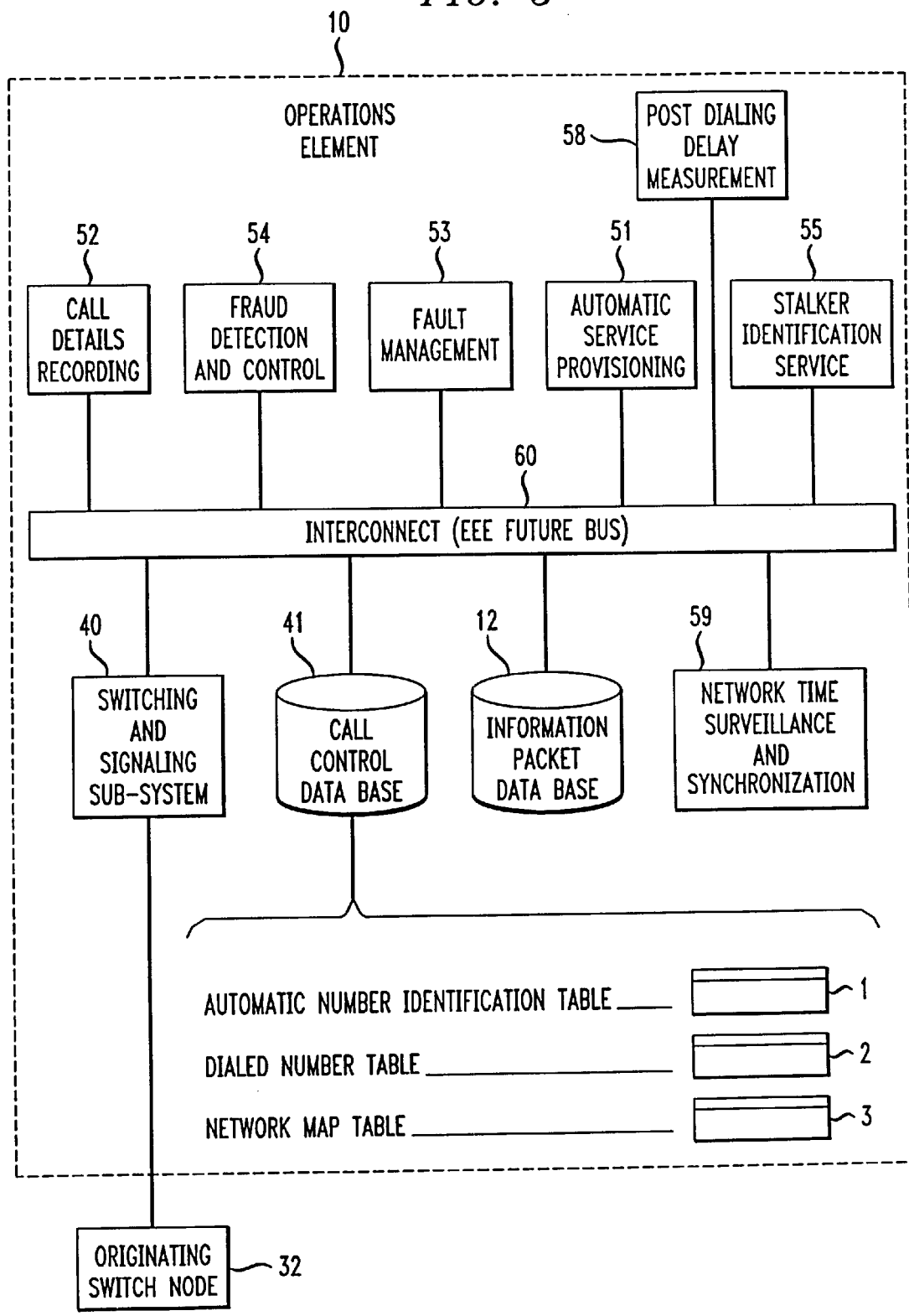
FIG. 5 illustrates an exemplary architecture of an operations element for managing a telecommunications network according to the present invention.

FIG. 5 illustrates an exemplary architecture of an operations element 10 for managing a telecommunications network according to the present invention. Processors along with resident software applications including: a post-dialing delay measurement program 58, a call details recording program 52, a fraud detection and control program 54, a fault management program 53, an automatic service provisioning program 51, a stalker identification service program 55 and a network time surveillance and synchronization program 59 (all discussed further below), which support the functions of the operations element 10, communicate with each other and with the switching and signaling subsystem 40 over the high-speed interconnect 60. The database of information packets 12 associated with the calls served by the network is accessible by each software application in the system. The call control database 11 may be consulted by the operations element 10 to determine proper routing and processing of calls (discussed further below).

Figure 6:
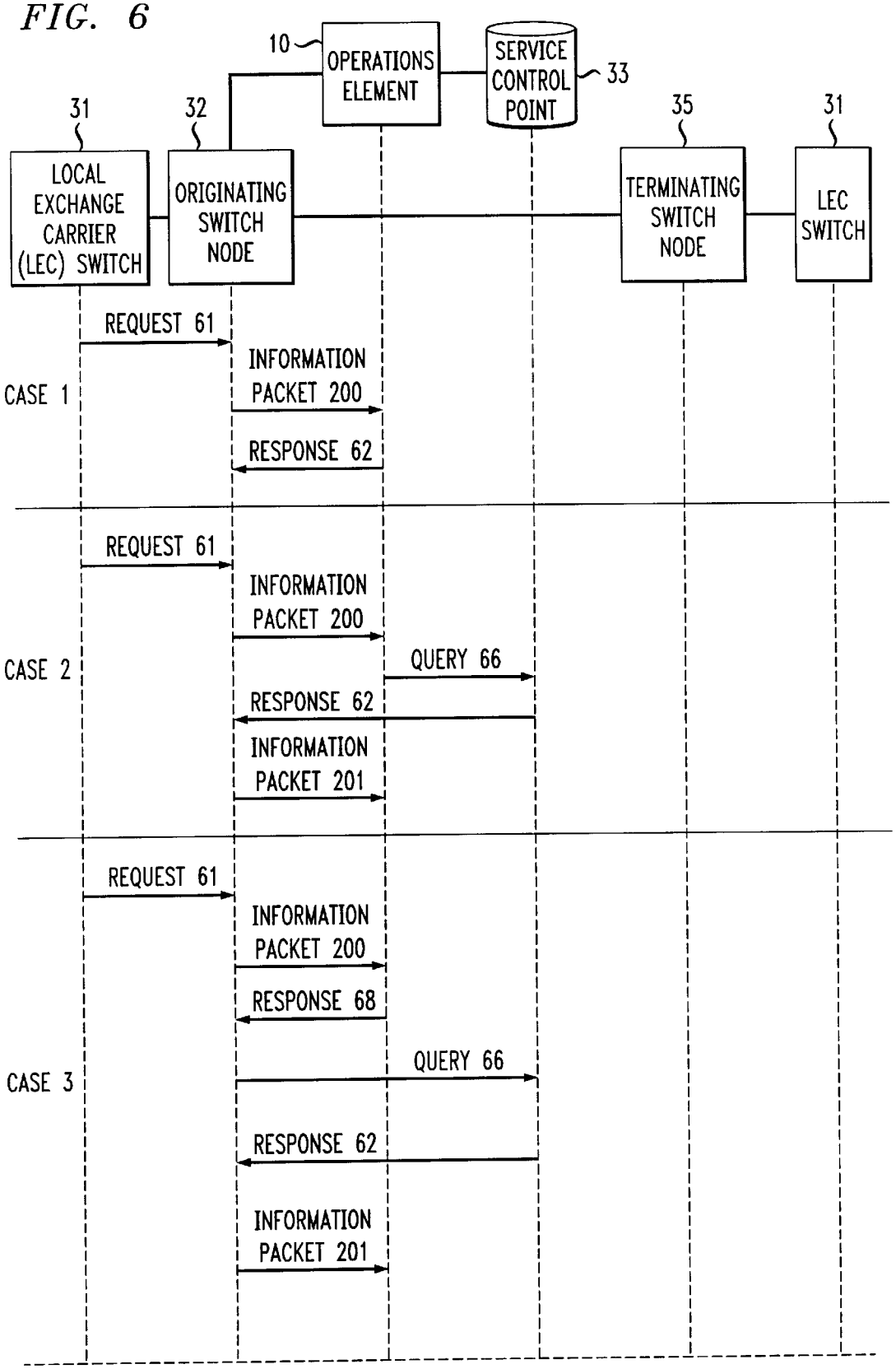
FIG. 6 illustrates three message flows for a call control function implemented by the operations element according to the preferred embodiment of the present invention.

The preferred embodiment of the call routing function performed by the operations element of the present invention is illustrated in FIG. 6. FIG. 6 illustrates three situations differentiated by case 1, case 2 and case 3, respectively. Referring to FIG. 6 case 1, an originating switch node 32, upon receiving a request message 61 from a local exchange carrier switch 31 associated with a calling party, appends transaction information to the message, forming an information packet 200, and forwards the information packet 200 to the operations element 10, informing the operations element 10 that the originating switch node 32 requires information regarding call routing and processing.

The operations element 10 determines whether it possesses the required call routing and processing instructions for the call, or whether the instructions reside with a service control point 33, by consulting the call control database (shown in FIG. 5). If the operations element 10 possesses the appropriate processing and routing instructions for the call, it provides these instructions to the originating switch node 32 via a response message 62.

On the other hand, as illustrated in FIG. 6 case 2, if the call processing and routing instructions reside with a service control point 33, the operations element 10 looks to the call control database to determine the appropriate service control point 33 to contact. The operations element 10 instructs the appropriate service control point 33 via a query message 66 to send a response message 62 containing processing and routing instructions to the originating switch node 32 identified in the query message 66.

As illustrated in FIG. 6 case 3, the operations element 10 knows whether it has available a direct path to the service control point 33. If no direct path is available, the operations element 10 sends a response message 68 to the originating switch node 32 telling it to seek instructions from the service control point 33 identified in the response message 68. The originating switch node 32 then transmits its own query message 66 to the service control point 33, and receives a response message 62 from the service control point 66 containing processing and routing instructions for the call. The originating switch node 32, upon receiving the response message 62, appends transaction information to the message, forming an information packet 201, and forwards the information packet 201 to the operations element 10, informing the operations element 10 that the originating switch node 32 received information regarding call routing and processing from the service control point 33.

Figure 7:
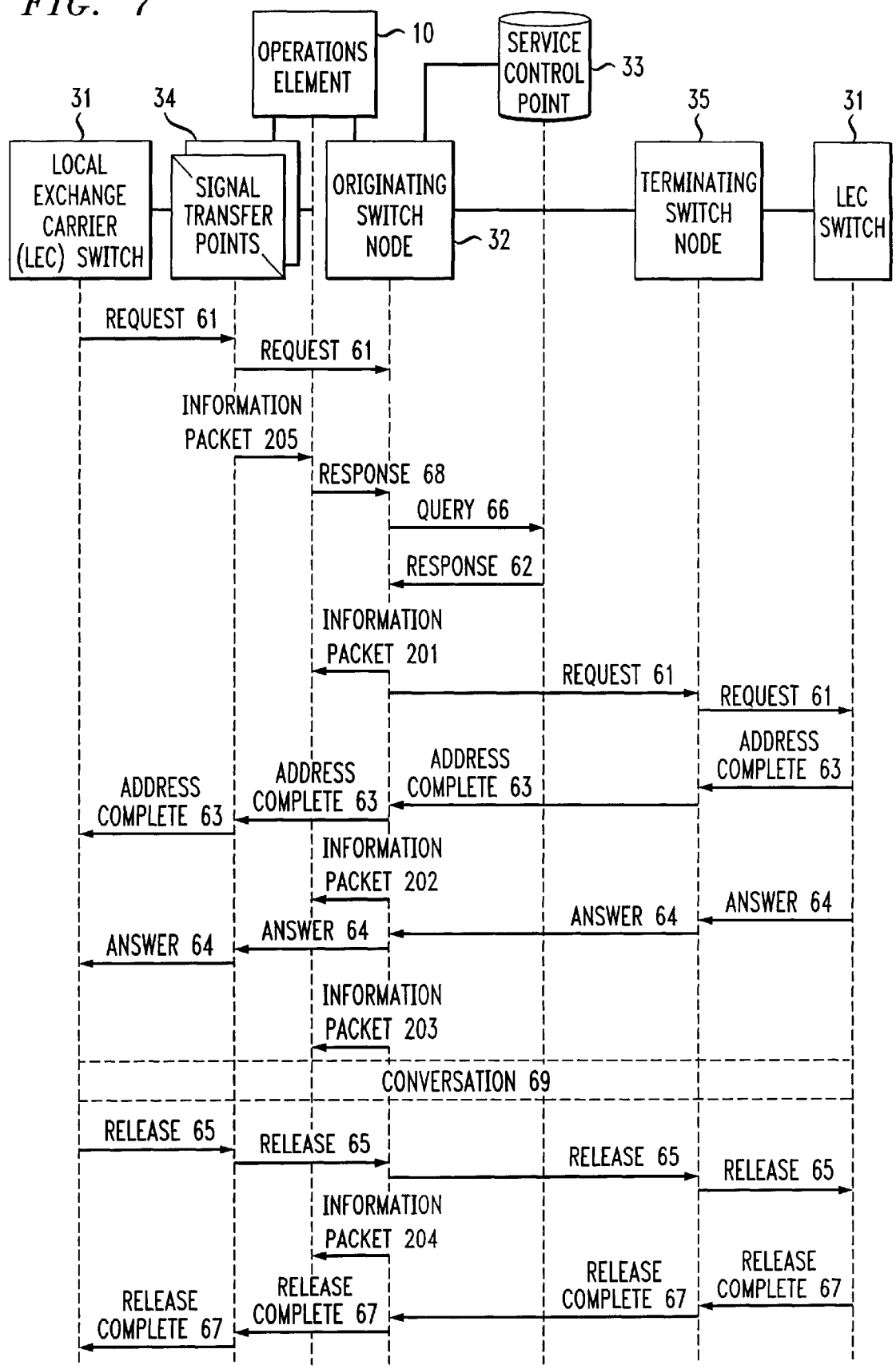
FIG. 7 illustrates a typical message flow for a call control function according to the second embodiment of the present invention.

As illustrated in FIG. 7, a second embodiment of the call routing function according to the present invention provides for an information packet 205 associated with a request message 61 to be received by the operations element 10 from a signal transfer point 34, rather than from an originating switch node 32. As in the preferred embodiment, the operations element 10 utilizes the call control database (shown in FIG. 5) to determine the processing and routing required for the call and forwards this information via a response message 62 to the originating switch node 32. The originating switch node 32, however, upon receiving the response message 62, must perform the additional function of correlating the response message 62 with the request message 61 it received from the signal transfer point 34. This correlation may be based on the identity of the local exchange carrier switch 31, the identity of the originating switch node 32, and other information contained in the request message. The originating switch node 32 then appends transaction information regarding the call to all subsequent messages it sends as information packets 201–204 to the operations element 10. The operations element 10 must also correlate the subsequent information packets 201–204 it receives from the originating switch node 32 with the information packet 205 it initially received from the signal transfer point 34. The aspects of FIG. 7 not discussed herein are assumed to be the same as those discussed previously with respect to FIG. 5.

Although the second embodiment achieves slightly lower post-dialing delay on calls where the originating switch node 32 subsequently needs to send a query message 66 to a service control point 33 to obtain routing and processing instructions for the call, there is development required within the network's originating switch nodes (only one shown) 32 for correlation of the request message 61 with the response message 62.

Figure 8:
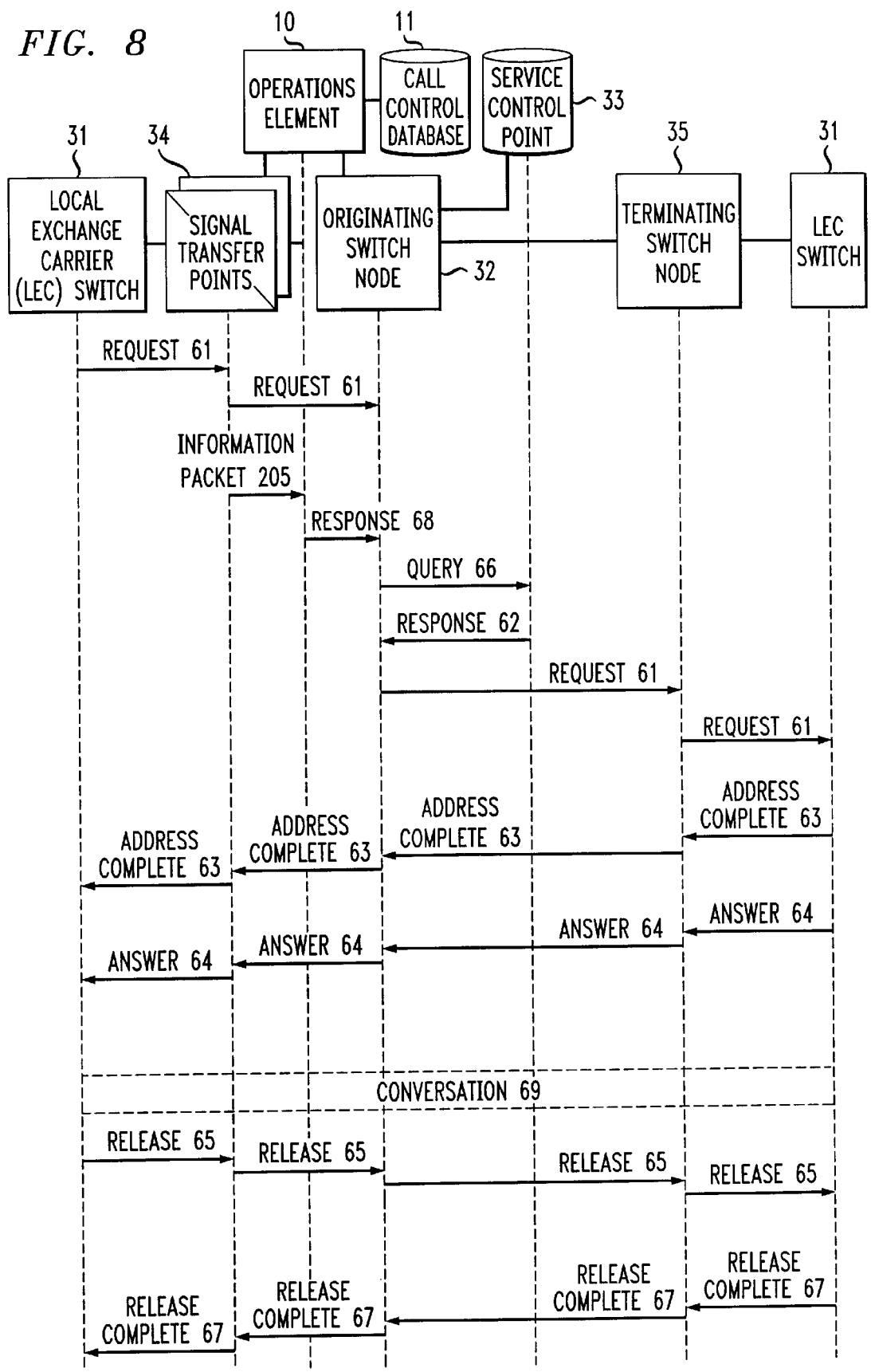
FIG. 8 illustrates a typical message flow for a call control function according to the third embodiment of the present invention.

A third embodiment of the call routing function according to the present invention is illustrated in FIG. 8. A signal transfer point 34 detects a request message 61 associated with an incoming call. The signal transfer point 34 appends transaction information to the request message 61, forming an information packet 205, and sends the information packet 205 to a stand-alone operations element 10. The operations element 10 utilizes a call control database 11 which is connected directly to the operations element 10 to determine the processing and routing required for the call. The operations element 10 sends a response message 62 containing routing and processing instructions to an originating switch node 32 or, if the instructions reside on a service control point as discussed in connection with FIG. 6, instructs it to seek instructions from service control point 33 identified in the response message 62. The originating switch node 32 correlates the response message with the request message 61 it received from the signal transfer point 34. The originating switch node 32 then either routes the call by itself, or requests further instructions from a service control point 33. Note that although the originating switch node 32 controls the remainder of the call set-up in accordance with previous descriptions, no information packet set is formed in the operations element 10. This embodiment also requires development within the network's originating switch nodes for correlation of the request message 61 with the response message 62.

The call details recording program 52, illustrated in FIG. 5, prepares one call detail record for each billable call established by the telecommunications network. The call detail record contains information captured in the information packets containing the request message, the response message(s) (from the operations element and, if utilized, a service control point), the answer message and the release message. Because of the time stamp in each information packet, the operations element 10 can develop a daily histogram of traffic intensity and other activity at each switch node and service control point. This data may form a source for planning future growth of the network.

In addition, the operations element 10 may support an application (not shown) which collects data for customers, e.g., customers having 800 or 900 numbers, and may present data such as call volume information or call origin information as a function of the time of day, day of week, etc. or data regarding calls intended for but never reaching the customer destinations directly to the customers via their own computers. The operations element 10 may also recognize when a customer with a particular 800 or 900 number is handling the maximum number of simultaneous calls possible, and upon receiving the information packet containing a request message for an additional call, may send a message to the originating switch node requesting that the caller be sent a pre-recorded voice message asking the caller to try again later. In this manner, calls which would have encountered a busy signal at the destination are stopped at the originating switch node without causing congestion in succeeding parts of the network.

A pattern of abusive phone calls, or stalking, may be detected by the stalker identification service 55 by monitoring the address complete messages associated with a particular telephone number.

The fault management application 53, residing on a processor in the operations element 10, analyzes the messages associated with each call handled by the network to determine if any call has failed. When a call fails, the operations element 10 launches a test call which originates and completes at the switching and signaling subsystem 40 of the operations element 10, traversing the same network elements (not shown) as were traversed by the original failed call.

Figure 9:
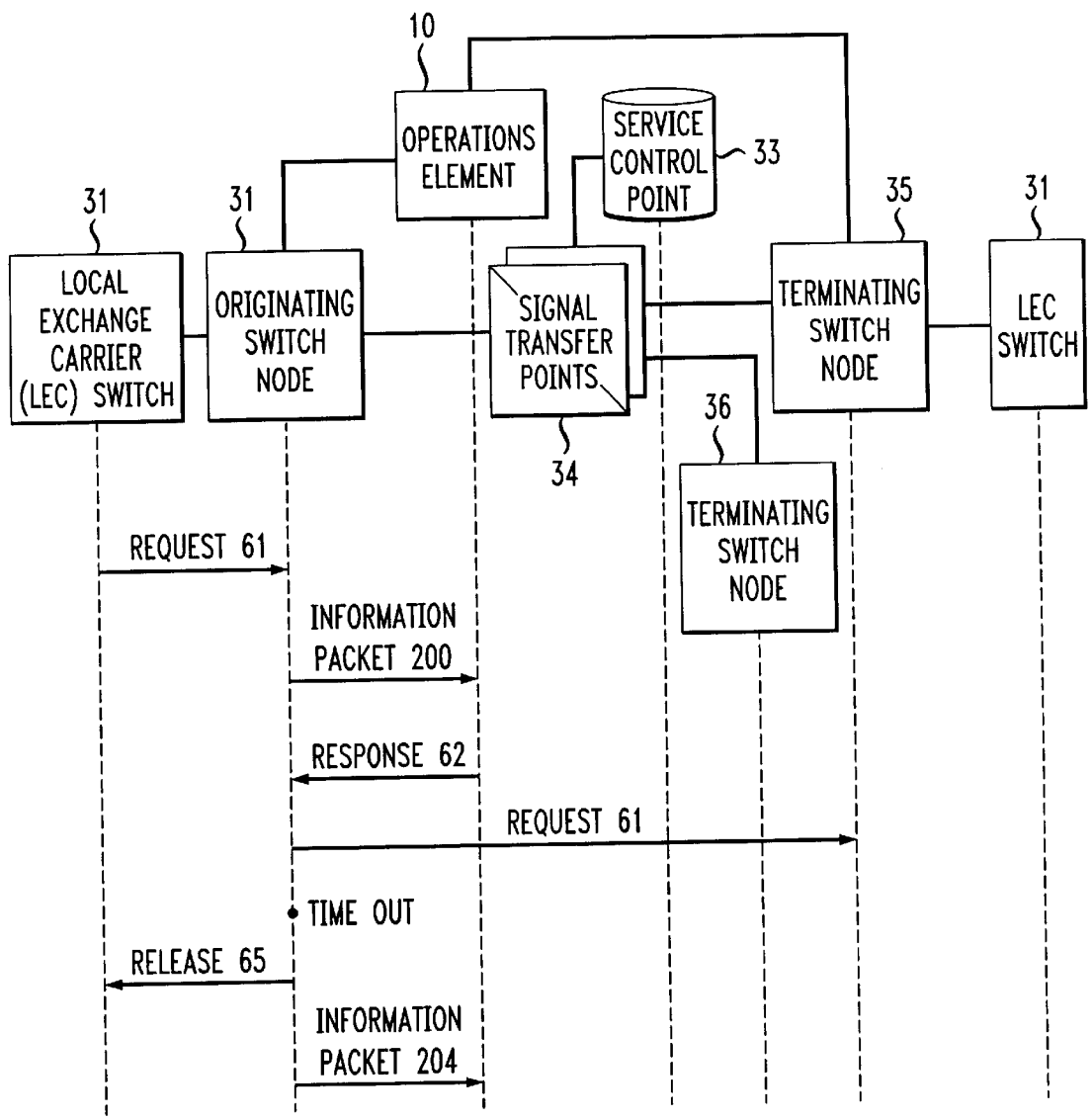
FIG. 9 illustrates a message flow resulting from a signal transfer point routing error according to the preferred embodiment of the present invention.

The following call flow describes how an error in a is signal transfer point routing table due to data corruption is detected and corrected by the operations element. Referring to FIG. 9, an originating switch node 32 receives a request message 61 from a local exchange carrier 31 serving the calling party, validates the message and appends appropriate transaction information to form an information packet 200, including a signal in the error code field noting whether an error was detected in the validation process. The originating switch node 32 then sends the information packet 200 to the operations element 10.

The fault management application (shown in FIG. 5) in the operations element 10 checks the error code field in the information packet 200 associated with the request message 61 to determine whether the call failed. Assuming that the call did not fail, and the operations element 10 may, as previously discussed, route the call on its own, the originating switch node 32 sends the request message 61 to a terminating switch node 35 via a signal transfer point 341 presuming that the signaling transfer point 34 will transfer the request to the appropriate terminating switch node 35. If the signaling transfer point 34 has a corrupted routing table, however, the request message 61 will be sent to the wrong terminating switch node 36. Because the intended terminating switch 35 node never received the request message 61, it does not forward an address complete message 63, an answer message (not shown) or a release message (not shown) to the originating switch node 32. The originating switch node 32 times out, sending a release message 65 to the local exchange carrier switch 31.

The originating switch node 32 appends transaction information to the release message 65, including an entry in the error code field indicating that a time-out error occurred, and forwards the resulting information packet 204 to the operations element 10. The fault management application checks the error code field and determines that the call failed.

Figure 10:
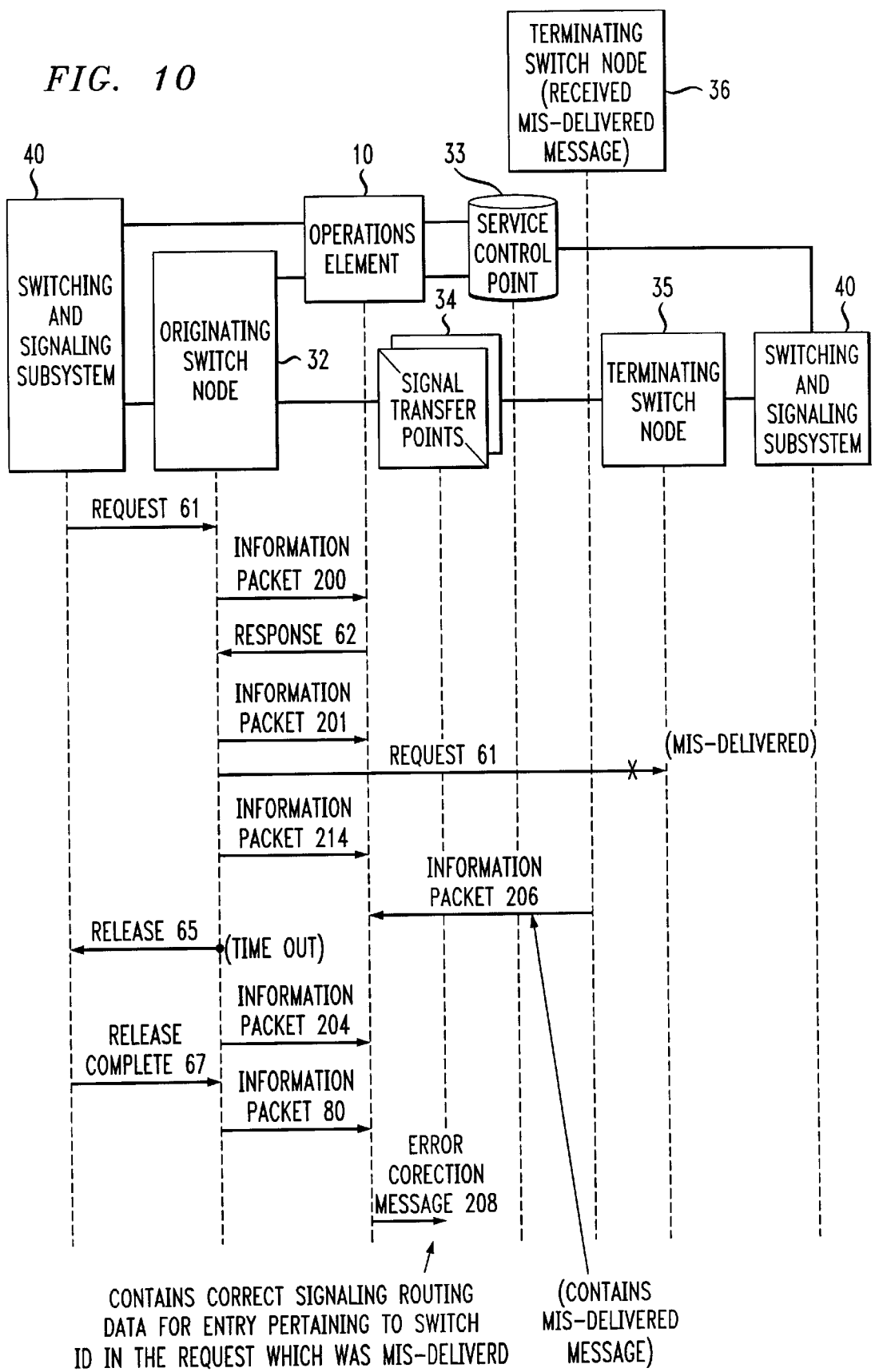
FIG. 10 illustrates the use of an automatic test call originating and terminating at the operations element, showing the identification and correction of a signal transfer point routing error in real-time.

As illustrated in FIG. 10, the operations element 10 automatically formulates and launches a new request message 61 based on the contents of the information packets (shown in FIG. 9) associated with the failed call. The test call is controlled by the same originating switch node 32 which previously sent the message indicating call failure, and completes back to the operations element 10 via the switching and signaling subsystem 40.

Upon receipt of the call request message 61, the originating switch node 32 sends an information packet 200 to the operations element 10 requesting processing and routing instructions for the call. The operations element 10 forwards a response message 62 to the switch 32 indicating to the switch 32 that the call is a test call, and how to process it, thus replicating the call set-up process of the failed call.

After the originating switch node 32 receives a response message 62 from the operations element 10, it forms an information packet 201 from the response message 62 and transmits the packet 201 to the operations element 10, allowing the operations element 10 to verify that the originating switch node 32 received accurate instructions from the operations element 10.

In possession of routing and processing instructions for the test call from the operations element 10, the originating switch node 32 sends the request message 61 to a terminating switch node 35 via a signal transfer point 34, embedding within the message a signal indicating that the call is a test call. The test call signal obligates each switch and service control point traversed by the call to transmit, as an information packet, a copy of each message it sends or receives to the operations element 10. As before, since the signaling transfer point's 34 routing table is corrupted, the request message 61 is sent to the wrong terminating switch node 36. Because the intended terminating switch node 35 never received the request message 61, it does not forward an address complete message, an answer message or a release message to the originating switch node 32. The originating switch node 32 times out.

This time, however, the terminating switch node 36 which received the misdelivered request message 61 is also obligated, because of the embedded parameter in the request message 61 it received from the originating switch node 32, to send an information packet 206 to the operations element 10 indicating in the error code field that it received a misdelivered message.

The originating switch node 32 releases the test call due to the time-out error, appends transaction information to the release message 65, including an entry in the error code field indicating that a time-out error occurred, and forwards the information packet 204 to the operations element 10.

The operations element 10 examines the information packets 200, 201 and 204 from the originating switch node 32 and the information packet 206 from the terminating switch node 36 receiving the misdelivered message and determines that the signal transfer point 34 has caused a routing error. The operations element 10 utilizes the network map table (shown in FIGS. 2 and 5) to determine which signal transfer points 34 serve the respective terminating switch nodes 35, 36, communicates with the errant signaling transfer point 34 via an error correction message 208, and modifies its routing table (not shown) to correct the error. A new test call is then placed to verify proper call routing.

The test call allows the operations element to receive a full complement of messages received and transmitted by each network element traversed by the test call, rather than only receiving the selected messages sent to the operations element by the originating switch node during the establishment of the original call. In this manner, the operations element is able to detect whether a problem which caused the call to fail is within a network element associated with the telecommunications system served by the operations element, or whether the problem is within an element outside of the system, for example, at a local exchange carrier, private branch exchange, or competitive access provider switch. If the problem is determined to be within the telecommunications system served by the operations element, the problem may be corrected by the operations element in real time. The operations element automatically logs a report of troubles which were corrected automatically, and will alert the telecommunications system if subsequent human action is required for repair.

Figure 11:
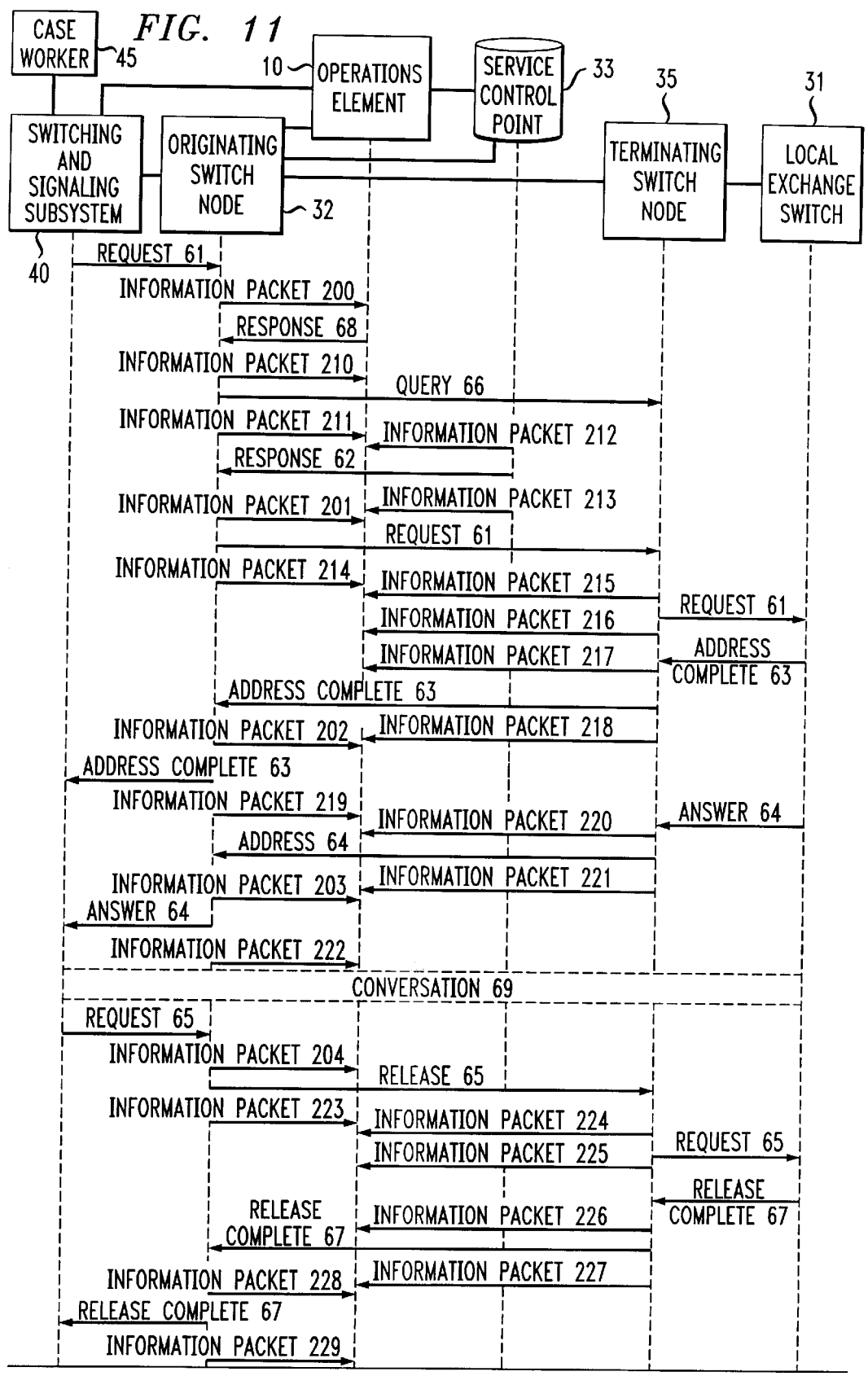
FIG. 11 illustrates messages sent to the operations element during a case-worker initiated test call originating at the operations element and terminating at a local exchange carrier switch or competitive access provider's switch.

Different types of test calls may be indicated by different test-call prefixes. For example, a customer may question the cost of a particular call, and request billing verification. As illustrated in FIG. 11, a case worker 45 may initiate a test call from the switching and signaling subsystem 40 to replicate the call in question, and utilize the messages received from each network element traversed by the call, along with accumulated billing charges obtained from a service biller (not shown) to demonstrate to the customer that the call was correctly routed and billed. The mechanics of the message flow for a typical call being established in a network have been previously discussed in connection with FIG. 3—the operations element 10 receives information packets 200–204 associated with selected messages from the originating switch node 32, such as the request message 61, the response message 62, the address complete message 63, the answer message 64 and the release message 65. In addition, as discussed with respect to FIG. 10, the test call allows the operations element 10 to receive a full complement of additional information packets 210–229 associated with messages received and transmitted by each network element 32, 33 and 35 traversed by the test call, rather than only receiving the selected information packets 200–204 sent to the operations element 10 by the originating switch node 32 during the establishment of a regular call.

In another example, referring to FIG. 2, an automatic test call originating and terminating at the operations element 10 may be placed with computer test equipment 46 at each end to verify the transmission performance 47 of a path between switch nodes 32, thus performing quality assurance testing without human involvement.

Again referring to FIG. 5, the post-dialing delay measurement program 58 in the operations element 10 works in cooperation with the fault management application 53 and the information packet database 12 to measure the time it takes a calling party who has dialed the number of a called party to hear a ring-back tone indicating that the called party's phone is ringing.

Figure 12:
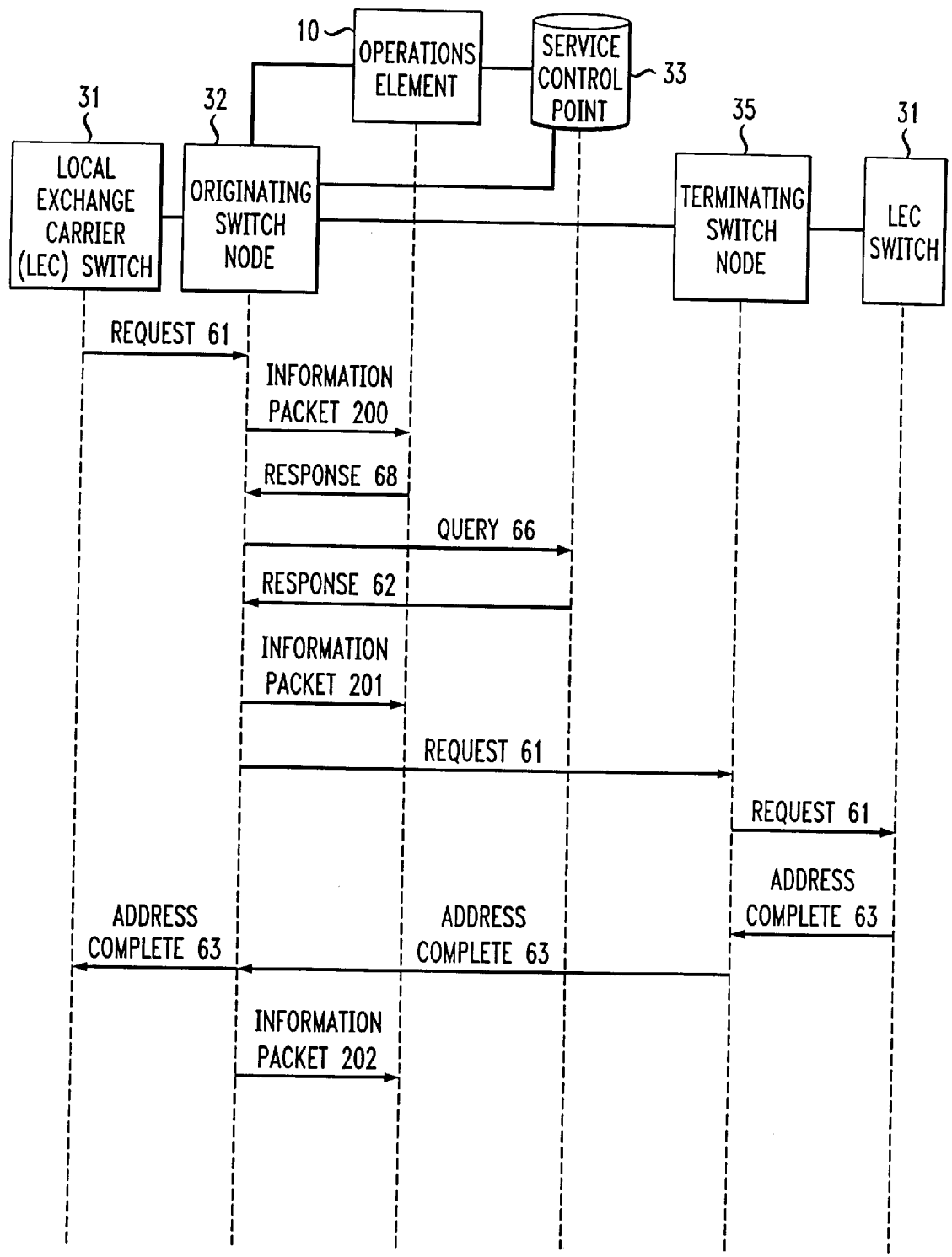
FIG. 12 illustrates a typical message flow for a call being set-up in the network, used for performing one portion of a post-dialing delay measurement.

As discussed previously in connection with FIG. 4, each information packet 80 forwarded to the operations element from a network element contains a time stamp 92 indicating the time at which the network element received the message contained in the information packet. As illustrated in FIG. 12, which shows a partial call set-up the message flow of which was previously discussed in connection with FIG. 3, the first information packet 200 received by the operations element 10 contains a request message 61, and the operations element 10 notes the value of the time stamp contained in the information packet 200. To determine a first component of post-dialing delay, the operations element 10 notes the difference in time stamp values between the information packet 202 containing the address complete message 63 and the information packet 200 containing the request message 61. Other components of post-dialing delay include (i) the time it takes a request message 61 to travel from the calling party's local exchange carrier switch 31 to the originating switch node 32, (ii) the time it takes the local exchange carrier switch 31 to process and transmit the request message 61, (iii) the time it takes an address complete message 63 to travel across the originating switch node 32 and to travel from the originating switch node 32 to the calling party's local exchange carrier switch 31, (iv) the time it takes the local exchange carrier switch 31 to start sending a ringback tone to the calling party after receiving the address complete message 63, and (v) the time it takes for a message, e.g. either a request message 61 or an address complete message 63, to travel across a signal transfer point (not shown) associated with the calling party's local exchange carrier switch 31.

Figure 13:
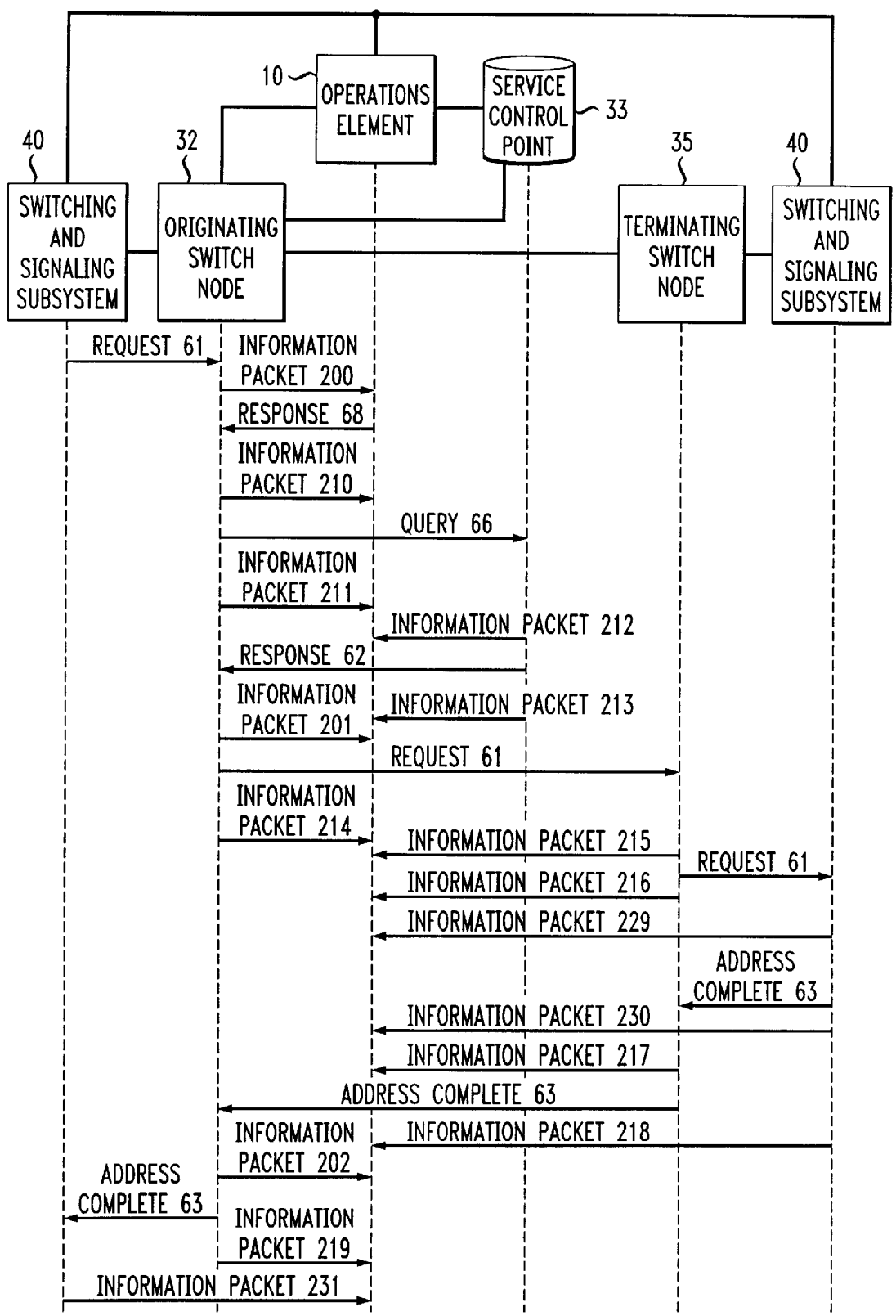
FIG. 13 illustrates the use of an automatic test call originating and terminating at the operations element used for performing other portions of a post-dialing delay measurement.

As illustrated in FIG. 13 and previously discussed in connection with FIG. 11, a test call placed by the operations element 10 provides a full complement of information packets 200–219 and 229–231 which may be used to compute the values of delay (i)–(v) between network elements 32, 33 and 35 and local exchange carrier 31 traversed by a particular call. To compute the value of delay (i), when the test call is initiated, the operations element 10 records the time. Upon receiving an information packet 200 from the originating switch node 32 containing the request message 61, the operations element 10 computes the difference between the time when the test call was initiated and the time stamp value in the information packet 200 representing the time that the request message 61 was received by the originating switch node 32. This difference may be normalized by a procedure which takes into account the difference in propagation times which result from the actual distance between the calling party's local exchange carrier switch (shown in FIG. 12) and the originating switch node 32 being either less than or greater than the distance between the operations element 10 and the originating switch node 32.

The analogous component of delay (iii) associated with the address complete message 63 is also determined from the test call data, and is equal to the difference in time stamp values contained in information packets 202 and 231, respectively. This component of delay is normalized in the same manner as component (i).

Delay component (ii) is computed by the operations element 10 by recording the time difference between when digits are received by the operations element 10 and when the request message is sent by the operations element for the test call. In this case, the operations element is serving as a proxy for the local exchange carrier switch. Delay component (iv) is also computed by the operations element 10 by recording the time of receipt of the address complete message and the time of starting the ringback tone on the test call. Delay component (v) is pre-stored in the operations element 10. Components (ii), (iv) and (v) are added to components (i) and (iii).

The values of the delay components (i)–(v) are then added to the first component of post-dialing delay to obtain a total post-dialing delay for the call, representing the round-trip propagation delay measured from the calling party's local exchange carrier switch.

If desired, a delay value representing the local loop, i.e., the time it takes the call to travel to/from the calling/called party's telephone to/from the calling/called party's local exchange carrier switch (a function of the distance of a party's phone from the local exchange carrier switch serving that party) may be added to the total post-dialing delay.

Figure 14:
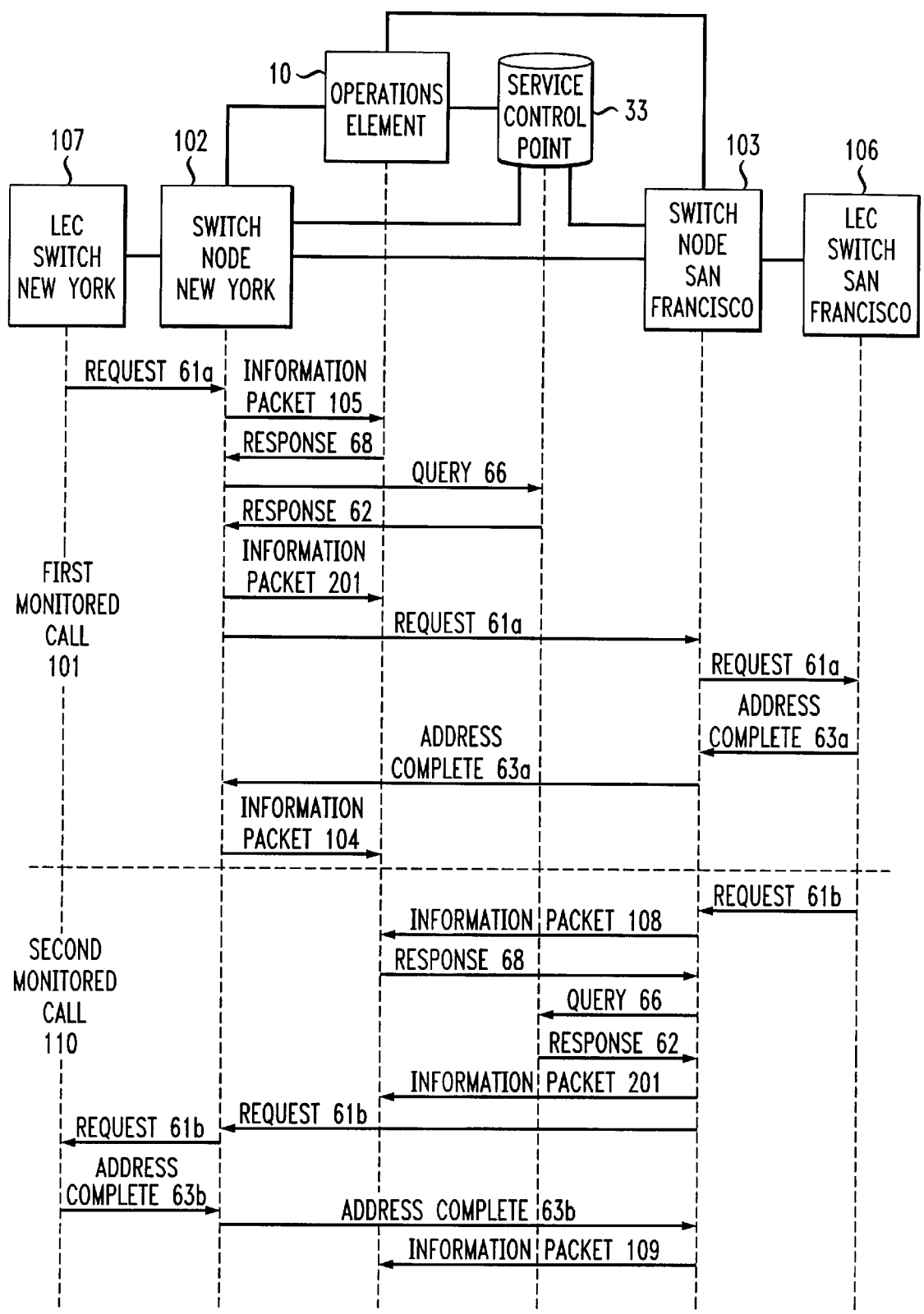
FIG. 14 illustrates a second method of computing total post-dialing delay for a single call.

A second method of computing the post-dialing delay associated with a single call involves monitoring by the operations element of two calls traveling between the same network nodes in opposite directions. For example, as illustrated in FIG. 14, a first monitored call 101 may originate in New York and terminate in San Francisco—the originating switch node 102 for the first call is located in or about New York and the terminating switch node 103 for the first call is located in or about San Francisco. A second monitored call 110 would thus originate in San Francisco and terminate in New York. Then the second call's originating switch node 103 would be located in San Francisco, and the terminating switch node 102 in New York.

A first component of post-dialing delay is computed by the operations element 10 for the first monitored call 101 by noting the difference in time stamp values between the information packet 104 (received from the switch node 102 located in New York) containing an address complete message 63a and the information packet 105 containing a request message 61a, and adding to the difference the time it takes an address complete message 63a to travel across the switch node 102 (this transfer time value is computed from data on test calls). Thus, the first component of post-dialing delay, besides including the transmission and processing delays associated with the request 61a and address complete 63a messages in the network, also includes (1) the actual time it took for the address complete message 63a to travel from the local exchange carrier switch 106 in San Francisco to the switch node 103 in San Francisco, (2) the processing time for the local exchange carrier switch 106 to determine that the called party's number is valid and the called party's line is idle, (3) the time between the start of the ringback signal to the called party and the sending of the address complete message 63a toward the switch node 103 in San Francisco and (4) the time it takes the address complete message to travel from the local exchange carrier switch 106 in San Francisco to the switch node 103 in San Francisco.

Similarly, a second component of post-dialing delay is computed by the operations element 10 for the second monitored call 110 by noting the difference in time stamp values between the information packet 109 containing the address complete message 63b and the information packet 108 containing the request message 61b received from the switch node 103 located in San Francisco. The second component of post-dialing delay includes the actual time it took for the address complete message 63b to travel from the local exchange carrier switch 107 in New York to the switch node 103 in San Francisco, along with the analogous components of delay (2)–(4) discussed in connection with the first component of post-dialing delay.

Adding the first component of delay to the second component of delay results in the delay between switch nodes 102, 103 in New York and San Francisco for the request messages 61a,b and the address complete messages 63a,b being counted twice. To correct this, a test call (not shown) placed by the operations element 10 may be used to compute the value of delay for a call traveling between New York and San Francisco.

This delay is comprised of the time it takes a request message to be transferred across switch node 103, plus the time it takes the request message to travel from the San Francisco switch node 103 to the New York switch node 102 and the time it takes to transfer the message across switch node 102, plus the address complete message transfer time across switch node 102, plus the time it takes the address complete message to travel from New York switch node 102 to the San Francisco switch node 103 and be transferred across switch node 103. This delay value should be subtracted from the sum of the first and second components of delay to obtain the post-dialing delay associated with a single call traveling between New York and San Francisco.

A final adjustment may be made to the post-dialing delay value by accounting for the difference between the processing time it takes for one of the local exchange carrier switches 106, 107 to receive dialed digits and send a request message 61a,b to a network switch 102, 103 and the time it takes to receive a request message 61a,b from the network switch 102, 103 and send an address complete message 63a,b to the network switch 102, 103 and start sending a ring back tone to the called party. Values representing the difference between the address complete message 63a,b processing time and the request message 61a,b processing time at each local exchange carrier 106, 107 (obtained from the local exchange carrier switch manufacturers) is maintained in a database (not shown) by the operations element 10. The values for each local exchange carrier 106, 107 involved in the call may be used by the operations element 10 to adjust the final value of post-dialing delay.

If desired, a delay value representing the local loop, i.e., the time it takes the call to travel to/from the calling/called party's telephone to/from the calling/called party's local exchange carrier switch (a function of the distance of a party's phone from the local exchange carrier switch serving that party) may be added to the total post-dialing delay.

The post-dialing delay measurements associated with all or a subset of the calls traversing the network may be stored in a database which is maintained by the operations element to develop a history of delays at different network elements and at different time periods. The database of delay values may be used for congestion management, long-range network planning, and clock surveillance and synchronization (discussed further below).

Figure 15:
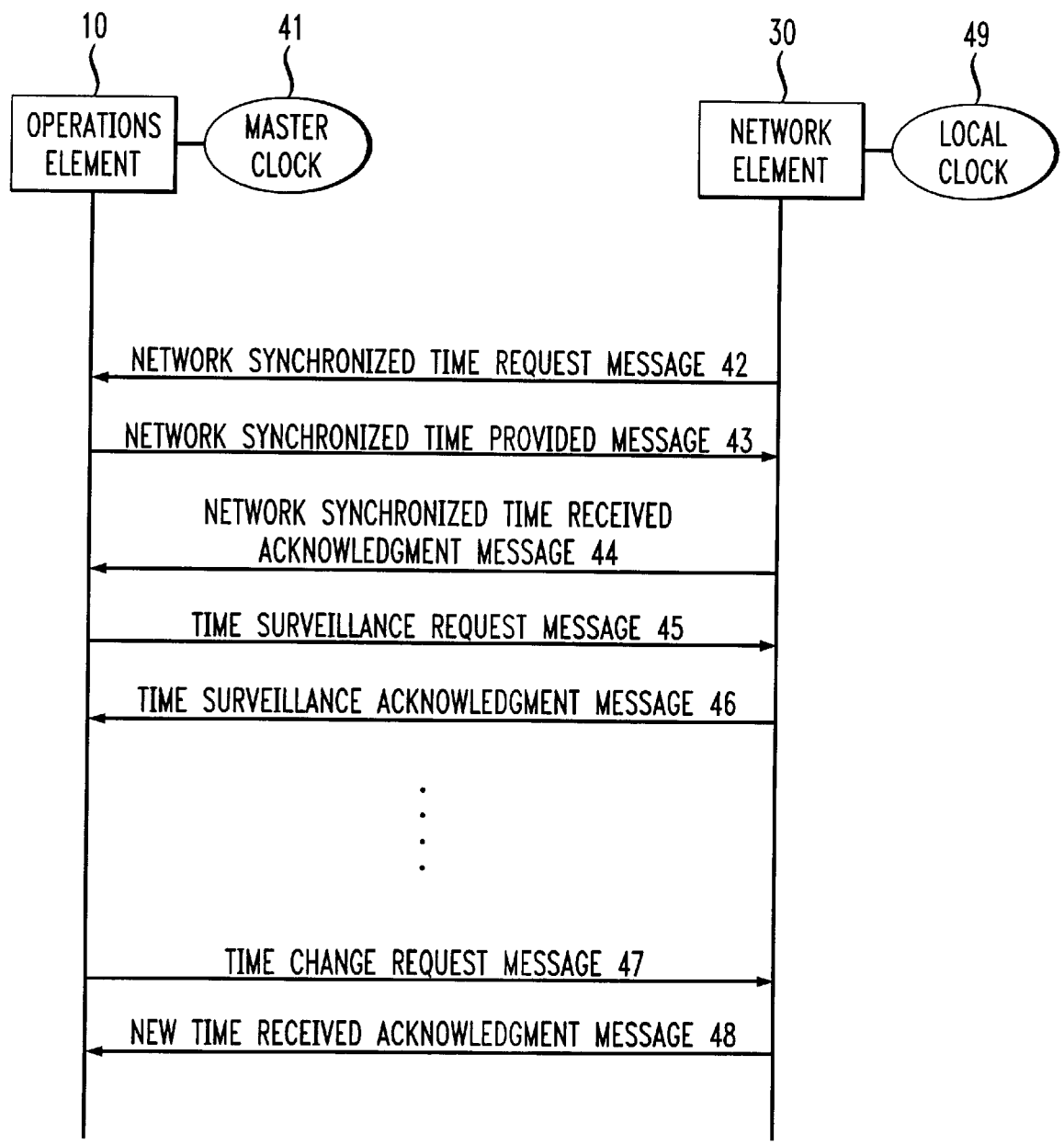
FIG. 15 illustrates messages associated with initializing and synchronizing network clocks.

Referring to FIG. 5, the operations element 10 according to the preferred embodiment of the present invention also supports a network time surveillance and synchronization application 59. As illustrated in FIG. 15, each network element 30 involved in the processing and routing of calls has a local clock 49 which should be synchronized to a highly accurate centralized master clock 41 maintained by the operations element 10. The centralized master clock 41 may be an atomic (Cesium) clock with a variation of less than 10 microseconds per year, synchronized to a national time source.

The operations element 10 may initialize clocks residing on network elements 30, and may update the value of network element clocks 49 when the clocks drift out of synchronization with the master clock 41.

To initialize a new clock, a network element 30 sends a network synchronized time request message 42 to the operations element 10. The operations element 10 obtains from the database of delay values a pre-calculated and normalized value of delay (discussed above) associated with the propagation of a signal from the operations element 10 to the network element 30 requesting synchronization, adds the delay value to the current value of the master clock 41, and sends the resulting sum to the network element 30 via a network synchronized time provided message 43. The network element 30 initializes its local clock 49 and sends back a network synchronized time received acknowledgement message 44 to the operations element 10, containing the value of the initialized clock 49.

To verify or update the value of a network element clock 49, the operations element 10 periodically sends a time surveillance request message 45 to the network element 30. In response, the network element 30 sends a time surveillance acknowledgement message 46 to the operations element 10, containing the value of the local clock 49 plus a value of message processing delay associated with receiving incoming messages at the network element 30 and transmitting messages from the network element 30 which is determined by the network element 30 itself. The message processing delay at the network element 30 is defined as the delay by which message input and processing delay exceeds the output processing delay time at the element 30.

The operations element 10 receives the acknowledgement message 46 from the network element 30. The message contains the local clock value 49 at the network element 30. Thee operations element 10 calculates the delay associated with sending a message to the network element, called the forward delay time, three times in succession (to obtain an average) using the following formula: Forward delay time= (round trip delay time−network element's message processing delay)/2. The delays are assumed to be symmetrical and the average forward delay is equal to the average backward delay. The clock value received plus the average backward delay is compared with the master clock time 41 at the time the time surveillance acknowledgement message was received. If the resultant value is substantially different than the correct time at the master clock 41, the operations element 10 sends to the network element a time change request message 47, containing the correct value of time according to the master clock 41 plus the forward delay time previously calculated plus the message processing delay associated with the network element. The network element then updates the time at the local clock 49, and sends a new time received acknowledgement message 48 to the operations element. The measured value of forward delay time may be added to the database of delay values.

To prevent clogging up the network with time surveillance request messages, the operations element 10 may monitor the status of the network element local clocks 49 each time an incoming call is received. For each call traversing the network, the operations element 10 receives information packets from originating switch nodes which contain time stamps representing the time at which particular messages (e.g., request messages, response messages, address complete messages, answer messages and release messages) were received by the originating switch nodes. The operations element notes the time when the information packets are received. By retrieving the value of the forward delay time from the database of delay values for the particular originating switch node sending the information packets, adding the forward delay time to the time stamp value contained in the information packet, and comparing it to the time of receipt of the information packet according the master clock 41, the operations element 10 is able to tell if the local clocks 30 are synchronized to the master clock 41 without sending time surveillance request messages 45 to each network element on a continuous basis.

The operations element may obtain time stamp values from the service control points if the service control points embed time stamp values in the messages they send to the originating switch nodes. Thus, when the operations element receives an information packet from an originating switch node containing a time stamp embedded in the transmitted message, the information packet contains two time stamp values. The first time stamp value is located in the transaction information section of the packet, and represents the time when the originating switch node received the message contained in the packet. The second time stamp value, embedded in the message itself, represents the local time at which the service control point sent the message to the originating switch node.

I claim:

1. A method of establishing a through path for a call which traverses a plurality of interconnected network elements within a telecommunications network, comprising:

detecting by an originating network element a request message indicating that the call has been initiated;

copying the request message;

forwarding the request message to succeeding interconnected network elements in the through path;

appending a set of transaction information including the following: a time stamp, an error code to the copied request message, so that the transaction information and the copied request message form an information packet;

including in the information packet an indication that the originating network element desires instructions regarding processing and routing of the call;

forwarding the information packet from the originating network element to a communications unit performing switching and signaling;

storing the information packets in an information packet database; and utilizing a call control database in communication with the communications unit to determine among routing alternatives the preferred processing and routing of the call based on the contents of the information packet.

2. The method according to claim 1, further comprising:

transmitting a message from the communications unit to the originating network element indicating how to process and route the call after consulting the call control database.

3. The method according to claim 1, further comprising:

transmitting a message from the communications unit to a second network element indicating that the second network element should notify the originating network element how to process and route the call after consulting the call control database and determining the identity of the second network element.

4. The method according to claim 3, further comprising:

extracting a calling party's phone number from the information packet forwarded to the communications unit;

looking up the calling party's number in the call control database which contains phone numbers which have been marked for fraud to determine whether the calling party's number has been marked for fraud after accessing a fraud detection application from the communications unit; and forwarding a message requesting call termination to the originating network element if the calling party's number has been marked for fraud.

5. The method according to claim 3, further comprising:

extracting a calling party's phone number from the information packet forwarded to the communications unit;

looking up the calling party's number in the call control database which contains numbers which have been marked for accumulated billing charges exceeding a threshold after accessing a service detection application from the communications unit; and forwarding a message requesting call termination to the originating network element if the calling party's number has been marked for accumulated billing charges exceeding the threshold.

6. The method according to claim 5, wherein the accumulated billing charges are associated with an abnormally long call being served by the telecommunications network.

7. The method according to claim 3, wherein the through path terminates at the communications unit, so that a customer of the telecommunications network may subscribe to new services automatically by communicating directly with the communications unit after accessing an automatic service provisioning application.

8. The method according to claim 7, further comprising:

routing the call to the communications unit;

connecting the customer to a speech recognition and voice response unit in communication with the communications unit;

recording of the customer's request for subscription to new services by the speech recognition and voice response unit;

extracting the customer's phone number from the information packet forwarded to the communications unit;

looking up the customer's phone number in a data table to determine whether the calling party's number has been marked for fraud or non-payment after accessing a fraud detection application from the communications unit; and informing the customer of the status of the request for subscription to new services.

* * * * *